United States Patent
Snider et al.

(10) Patent No.: US 11,686,144 B2
(45) Date of Patent: Jun. 27, 2023

(54) SLIDER WINDOW ASSEMBLY WITH SWITCH DEVICE

(71) Applicant: Magna Mirrors of America, Inc., Holland, MI (US)

(72) Inventors: Darin J. Snider, Holland, MI (US); David L. Guillozet, Hamilton, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 17/652,295

(22) Filed: Feb. 24, 2022

(65) Prior Publication Data
US 2022/0268078 A1 Aug. 25, 2022

Related U.S. Application Data

(60) Provisional application No. 63/200,253, filed on Feb. 24, 2021.

(51) Int. Cl.
*B60J 1/18* (2006.01)
*E05F 15/643* (2015.01)
*E05F 15/655* (2015.01)

(52) U.S. Cl.
CPC .......... *E05F 15/643* (2015.01); *B60J 1/1853* (2013.01); *E05F 15/655* (2015.01); *E05Y 2201/11* (2013.01); *E05Y 2201/654* (2013.01); *E05Y 2400/445* (2013.01); *E05Y 2400/822* (2013.01); *E05Y 2900/55* (2013.01)

(58) Field of Classification Search
CPC .......... E05Y 2201/11; E05Y 2400/445; E05Y 2900/55; E05Y 15/643; E05Y 15/655; E05Y 2201/654; E05Y 2400/822; B60J 1/1863; B60J 1/16
USPC .......................................................... 49/413
See application file for complete search history.

(56) References Cited

U.S. PATENT DOCUMENTS

| | | | |
|---|---|---|---|
| 957,728 A | 5/1910 | Bliss |
| 1,204,702 A | 11/1916 | Schupp |
| 2,762,675 A | 9/1956 | Janows |
| 2,858,408 A | 10/1958 | Barroero |
| 2,912,714 A | 11/1959 | Rich |
| 2,962,773 A | 12/1960 | Heller |

(Continued)

FOREIGN PATENT DOCUMENTS

CN 106401363 A * 2/2017
CN 109403803 A * 3/2019 ............ E05F 15/635

*Primary Examiner* — Jerry E Redman
(74) *Attorney, Agent, or Firm* — Honigman LLP

(57) ABSTRACT

A vehicular slider window assembly includes a frame having upper and lower rails. A fixed window has an opening and the rails are attached at the fixed window. A movable window is movable between a closed position and an opened position. A carrier disposed at a lower edge of the movable window moves with the movable window between the opened and closed positions. A sensing system determines when the movable window is in the closed position and includes a switch assembly that is actuated when the movable window is in the closed position. The switch assembly includes a switch device within a housing. A portion of the housing is an end stop configured to limit movement of the carrier when the movable window is in the closed position. The switch device includes a contact and, when the movable window is in the closed position, the contact actuates the switch device.

24 Claims, 21 Drawing Sheets

(56) References Cited

U.S. PATENT DOCUMENTS

| | | | |
|---|---|---|---|
| 3,177,989 A | 4/1965 | Di Chiaro | |
| 3,237,250 A | 3/1966 | Scoville | |
| 3,379,859 A | 4/1968 | Marriott | |
| 3,508,361 A | 4/1970 | Ryder | |
| 3,715,707 A | 2/1973 | Anderson | |
| 3,893,260 A | 7/1975 | Cadiou | |
| 3,898,427 A | 8/1975 | Levin et al. | |
| 3,911,245 A | 10/1975 | O'Shaughnessy | |
| 3,964,068 A | 6/1976 | Torii et al. | |
| 3,995,142 A | 11/1976 | Ciardelli et al. | |
| 4,023,008 A | 5/1977 | Durussel | |
| 4,065,848 A | 1/1978 | Dery | |
| 4,081,926 A | 4/1978 | Jardin | |
| 4,124,054 A | 11/1978 | Spretnjak | |
| 4,137,447 A | 1/1979 | Boaz | |
| 4,158,270 A | 6/1979 | Cherbourg et al. | |
| 4,171,594 A | 10/1979 | Colanzi | |
| 4,244,774 A | 1/1981 | Dery | |
| RE30,663 E | 6/1981 | Schnitzius | |
| 4,388,522 A | 6/1983 | Boaz | |
| 4,410,843 A | 10/1983 | Sauer et al. | |
| 4,415,196 A | 11/1983 | Baum et al. | |
| 4,450,346 A | 5/1984 | Boaz | |
| 4,458,445 A | 7/1984 | Sauer et al. | |
| 4,519,443 A | 5/1985 | Sutoh et al. | |
| 4,552,611 A | 11/1985 | Dery et al. | |
| 4,606,159 A | 8/1986 | Kunert | |
| 4,611,849 A | 9/1986 | Frenkler | |
| 4,635,398 A | 1/1987 | Nakamura | |
| 4,674,231 A | 6/1987 | Radek et al. | |
| 4,723,809 A | 2/1988 | Kida et al. | |
| 4,738,052 A | 4/1988 | Koshida | |
| 4,785,583 A | 11/1988 | Kawagoe et al. | |
| 4,883,940 A | 11/1989 | Tokarz | |
| 4,920,698 A | 5/1990 | Friese et al. | |
| 4,934,098 A | 6/1990 | Prouteau et al. | |
| 4,970,911 A | 11/1990 | Ujihara et al. | |
| 4,995,195 A | 2/1991 | Olberding et al. | |
| 5,046,283 A | 9/1991 | Compeau et al. | |
| 5,146,712 A | 9/1992 | Hlavaty | |
| 5,228,740 A | 7/1993 | Saltzman | |
| 5,245,788 A | 9/1993 | Riegelman | |
| 5,294,168 A | 3/1994 | Kronbetter | |
| 5,308,247 A | 5/1994 | Dyrdek | |
| 5,333,411 A | 8/1994 | Tschirschwitz et al. | |
| 5,345,717 A | 9/1994 | Mori et al. | |
| 5,363,596 A | 11/1994 | Kronbetter | |
| 5,367,827 A | 11/1994 | Tajima et al. | |
| 5,442,880 A | 8/1995 | Gipson | |
| 5,466,911 A | 11/1995 | Spagnoli et al. | |
| 5,467,560 A | 11/1995 | Camp et al. | |
| 5,473,840 A | 12/1995 | Gillen et al. | |
| 5,505,023 A | 4/1996 | Gillen et al. | |
| 5,522,191 A | 6/1996 | Wenner et al. | |
| 5,525,401 A | 6/1996 | Hirmer | |
| 5,531,046 A | 7/1996 | Kollar et al. | |
| 5,542,214 A | 8/1996 | Buening | |
| 5,572,376 A | 11/1996 | Pace | |
| 5,613,323 A | 3/1997 | Buening | |
| 5,617,675 A | 4/1997 | Kobrehel | |
| 5,711,112 A | 1/1998 | Barten et al. | |
| 5,716,536 A | 2/1998 | Yokoto et al. | |
| 5,724,769 A | 3/1998 | Cripe et al. | |
| 5,724,771 A | 3/1998 | Gipson | |
| 5,784,833 A | 7/1998 | Sponable et al. | |
| 5,799,444 A | 9/1998 | Freimark et al. | |
| 5,799,449 A | 9/1998 | Lyons et al. | |
| 5,822,922 A | 10/1998 | Grumm et al. | |
| 5,836,110 A | 11/1998 | Buening | |
| 5,853,895 A | 12/1998 | Lewno | |
| 5,890,321 A | 4/1999 | Staser et al. | |
| 5,953,887 A | 9/1999 | Lucas et al. | |
| 5,996,284 A | 12/1999 | Freimark et al. | |
| 6,014,840 A * | 1/2000 | Ray | H05B 3/84 49/413 |
| 6,026,611 A | 2/2000 | Ralston et al. | |
| 6,086,138 A | 7/2000 | Xu et al. | |
| 6,112,462 A | 9/2000 | Kolar | |
| 6,119,401 A | 9/2000 | Lin et al. | |
| 6,119,402 A | 9/2000 | Wisner | |
| 6,125,585 A | 10/2000 | Koneval et al. | |
| 6,161,894 A | 12/2000 | Chapman | |
| 6,223,470 B1 | 5/2001 | Millard et al. | |
| 6,225,904 B1 | 5/2001 | Jaffe et al. | |
| 6,293,609 B1 | 9/2001 | Xu et al. | |
| 6,324,788 B1 | 12/2001 | Koneval et al. | |
| 6,328,243 B1 | 12/2001 | Yamamoto | |
| 6,490,832 B1 | 12/2002 | Fischbach et al. | |
| 6,525,659 B2 | 2/2003 | Jaffe et al. | |
| 6,591,552 B1 | 7/2003 | Rasmussen | |
| 6,598,931 B2 | 7/2003 | Tamura | |
| 6,665,983 B1 | 12/2003 | Zimmerman | |
| 6,691,464 B2 | 2/2004 | Nestell et al. | |
| 6,742,819 B2 | 6/2004 | So et al. | |
| 6,766,617 B2 | 7/2004 | Purcell | |
| 6,955,009 B2 | 10/2005 | Rasmussen | |
| 7,003,916 B2 | 2/2006 | Nestell et al. | |
| 7,010,883 B2 | 3/2006 | Jaerpsten et al. | |
| 7,073,293 B2 | 7/2006 | Galer | |
| 7,184,190 B2 | 2/2007 | McCabe et al. | |
| 7,186,118 B2 | 3/2007 | Hansen et al. | |
| 7,255,451 B2 | 8/2007 | McCabe et al. | |
| 7,259,359 B2 | 8/2007 | Davey et al. | |
| 7,400,435 B2 | 7/2008 | Byers et al. | |
| 7,608,949 B2 | 10/2009 | Busch | |
| 7,626,749 B2 | 12/2009 | Baur et al. | |
| 7,871,272 B2 | 1/2011 | Firman, II et al. | |
| 7,900,863 B1 | 3/2011 | Cheng | |
| 8,042,664 B2 | 10/2011 | Rutkowski et al. | |
| 8,151,519 B2 | 4/2012 | Bello et al. | |
| 8,402,695 B2 * | 3/2013 | Smith | H01R 35/02 49/413 |
| 8,881,458 B2 * | 11/2014 | Snider | E05C 1/08 49/213 |
| 8,915,018 B2 | 12/2014 | Snider | |
| 8,938,914 B2 | 1/2015 | Hulst et al. | |
| 9,579,955 B2 | 2/2017 | Snider | |
| 9,642,187 B2 * | 5/2017 | Snider | H05B 1/0227 |
| 9,688,122 B2 * | 6/2017 | Gipson | H05B 3/84 |
| 9,731,580 B2 * | 8/2017 | Snider | E05F 15/643 |
| 10,266,037 B2 * | 4/2019 | Hulst | E05D 15/0621 |
| 10,501,977 B2 | 12/2019 | Snider et al. | |
| 10,524,313 B2 | 12/2019 | Snider et al. | |
| 10,843,644 B2 | 11/2020 | Snider | |
| 11,013,069 B2 * | 5/2021 | Lahnala | E05F 11/535 |
| 11,425,798 B2 * | 8/2022 | Snider | B60J 1/007 |
| 2003/0074842 A1 | 4/2003 | Eckhardt et al. | |
| 2003/0140562 A1 | 7/2003 | Staser et al. | |
| 2003/0188490 A1 | 10/2003 | Kraus et al. | |
| 2003/0213179 A1 | 11/2003 | Galer | |
| 2004/0020131 A1 | 2/2004 | Galer et al. | |
| 2004/0065017 A1 | 4/2004 | Priest et al. | |
| 2004/0065018 A1 | 4/2004 | Regnier et al. | |
| 2006/0032140 A1 * | 2/2006 | Arimoto | E05F 15/646 49/413 |
| 2006/0061008 A1 | 3/2006 | Karner et al. | |
| 2006/0107600 A1 | 5/2006 | Nestell et al. | |
| 2006/0130405 A1 | 6/2006 | Hemond et al. | |
| 2007/0075859 A1 | 4/2007 | Garavuso | |
| 2007/0209283 A1 | 9/2007 | Ostrowski et al. | |
| 2007/0277443 A1 | 12/2007 | Dery et al. | |
| 2008/0122262 A1 | 5/2008 | Cicala | |
| 2008/0127563 A1 | 6/2008 | Tooker | |
| 2008/0202032 A1 | 8/2008 | Loidolt | |
| 2009/0019778 A1 | 1/2009 | Lahnala | |
| 2009/0140858 A1 | 6/2009 | Gore | |
| 2009/0322705 A1 | 12/2009 | Halsey, IV | |
| 2010/0146859 A1 | 6/2010 | Gipson et al. | |
| 2010/0154312 A1 * | 6/2010 | Gipson | E05D 15/0621 49/413 |
| 2010/0182143 A1 | 7/2010 | Lynam | |
| 2010/0194550 A1 | 8/2010 | Suzuki | |
| 2010/0240229 A1 * | 9/2010 | Firman, II | H01R 13/6205 439/39 |

(56) References Cited

U.S. PATENT DOCUMENTS

| | | | |
|---|---|---|---|
| 2011/0030276 A1* | 2/2011 | Smith | B60J 1/1853 49/70 |
| 2012/0091113 A1* | 4/2012 | Bennett | H05B 3/84 49/70 |
| 2013/0283693 A1* | 10/2013 | Huizen | E05F 11/488 49/123 |
| 2014/0047772 A1 | 2/2014 | Hulst | |
| 2014/0062466 A1* | 3/2014 | Thibault | G01B 7/14 324/207.22 |
| 2015/0167372 A1* | 6/2015 | Hulst | B60J 1/1853 49/123 |
| 2015/0348385 A1 | 12/2015 | Lamb | |
| 2016/0121699 A1* | 5/2016 | Snider | E05F 15/60 49/13 |
| 2019/0383084 A1 | 12/2019 | Snider et al. | |
| 2020/0240191 A1 | 7/2020 | Gustafson | |
| 2020/0355012 A1* | 11/2020 | Kojima | E05F 15/695 |
| 2022/0268078 A1* | 8/2022 | Snider | E05F 15/643 |

* cited by examiner

SLIDER WINDOW ASSEMBLY WITH SWITCH DEVICE

CROSS REFERENCE TO RELATED APPLICATION

The present application claims the filing benefits of U.S. provisional application Ser. No. 63/200,253, filed Feb. 24, 2021, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system, such as described in U.S. Pat. No. 8,151,519, which is hereby incorporated herein by reference in its entirety.

SUMMARY OF THE INVENTION

A vehicular rear slider window assembly has a lower channel that slidably receives a movable window panel (and a carrier at the lower region of the movable window panel) therein, with a switch assembly that determines when the movable window panel is in its fully closed position. The carrier of the movable window panel is received in and moved along the lower channel via operation of a powered window drive system, which imparts movement of the carrier and movable window along the lower channel between its opened and closed positions, such as via moving or pulling at a drive cable attached at either end of the carrier, with a sheath of the cable engaged at the ends of the channel. The switch assembly comprises a housing portion that is molded as part of the end stop disposed at the end of the channel, and a switch device that is disposed within the housing and that has a movable contact element that extends along the channel toward an end of the carrier of the movable window panel. The housing and switch device are encased within an elastomeric (e.g., rubber) boot or cover that covers the movable contact element, such that, when the window is closed, the end of the carrier contacts the boot or cover at the movable contact element, which causes movement of the contact element to actuate the switch device to determine that the window is fully closed. When the movable window panel is not in its closed position, the movable contact element is biased towards its non-contacted or moved position or state and thus the switch device determines that the movable window panel is not fully closed.

Responsive to determination that the switch device is actuated, the system may control an indicator to indicate to the driver of the vehicle that the window is opened or closed. For example, the system may activate an indicator (such as a light or light emitting diode (LED) in the cabin of the vehicle and viewable by the driver of the vehicle) when the window is at least partially opened (as determined by the contact element of the switch device not being contacted and moved by the carrier), and the system may deactivate the indicator when the switch device determines that the window is fully closed (as determined by the contact element of the switch device being contacted and moved by the carrier).

These and other objects, advantages, purposes and features of the present invention will become apparent upon review of the following specification in conjunction with the drawings.

DESCRIPTION OF THE PREFERRED EMBODIMENTS

Figure 1:
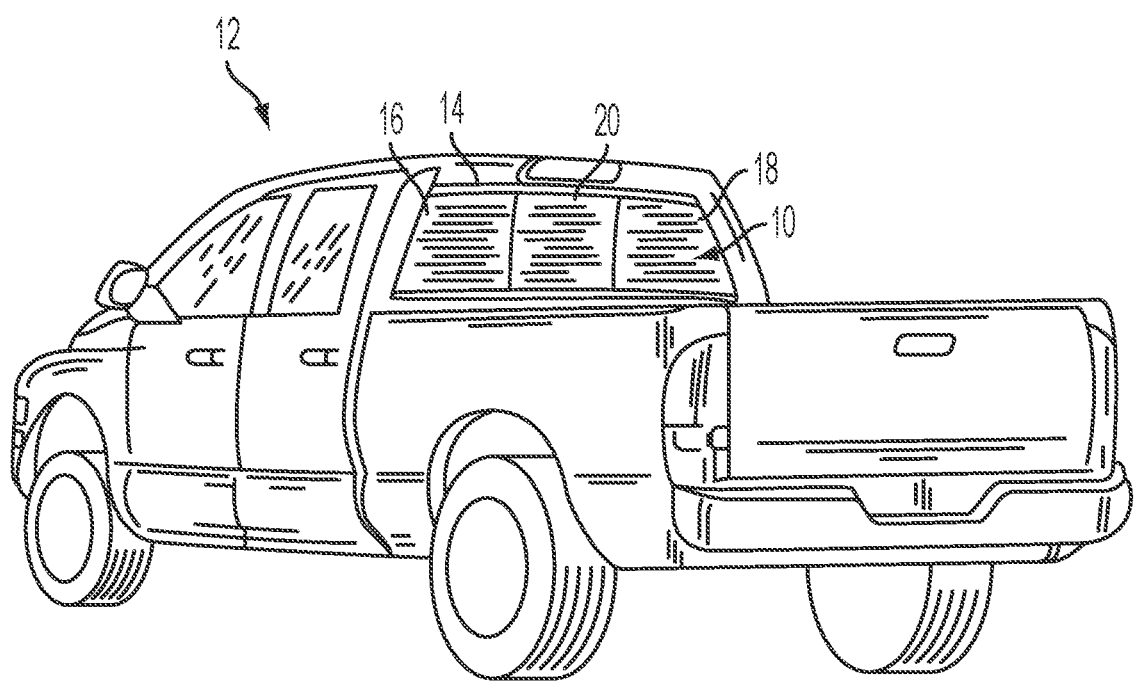
FIG. 1 is a rear perspective view of a pickup truck having a rear slider window assembly.
Figure 2:
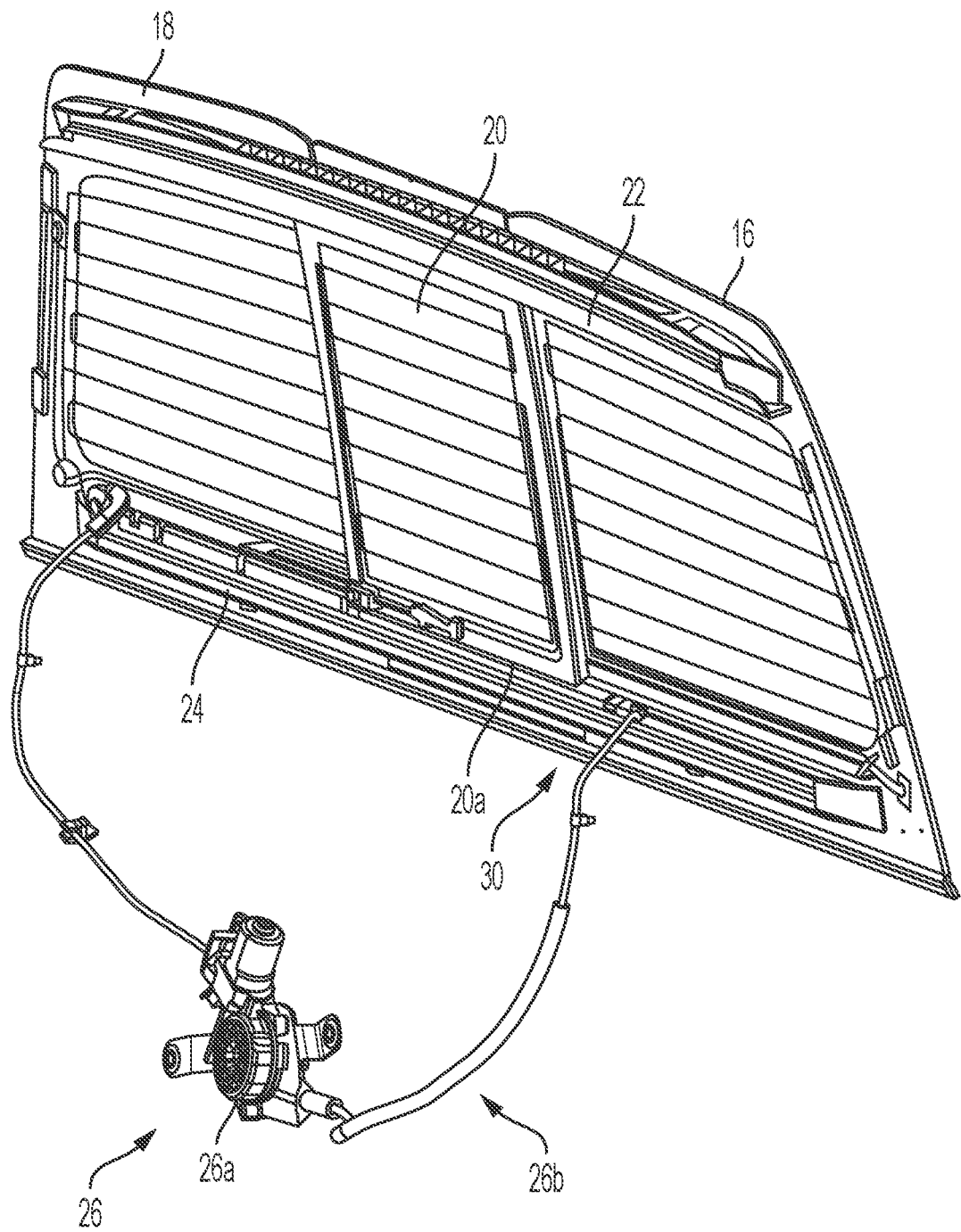
FIG. 2 is a perspective view of the rear slider window assembly, as viewed from the forward or interior side of the window assembly when the window assembly is normally mounted to a vehicle.
Figure 3:
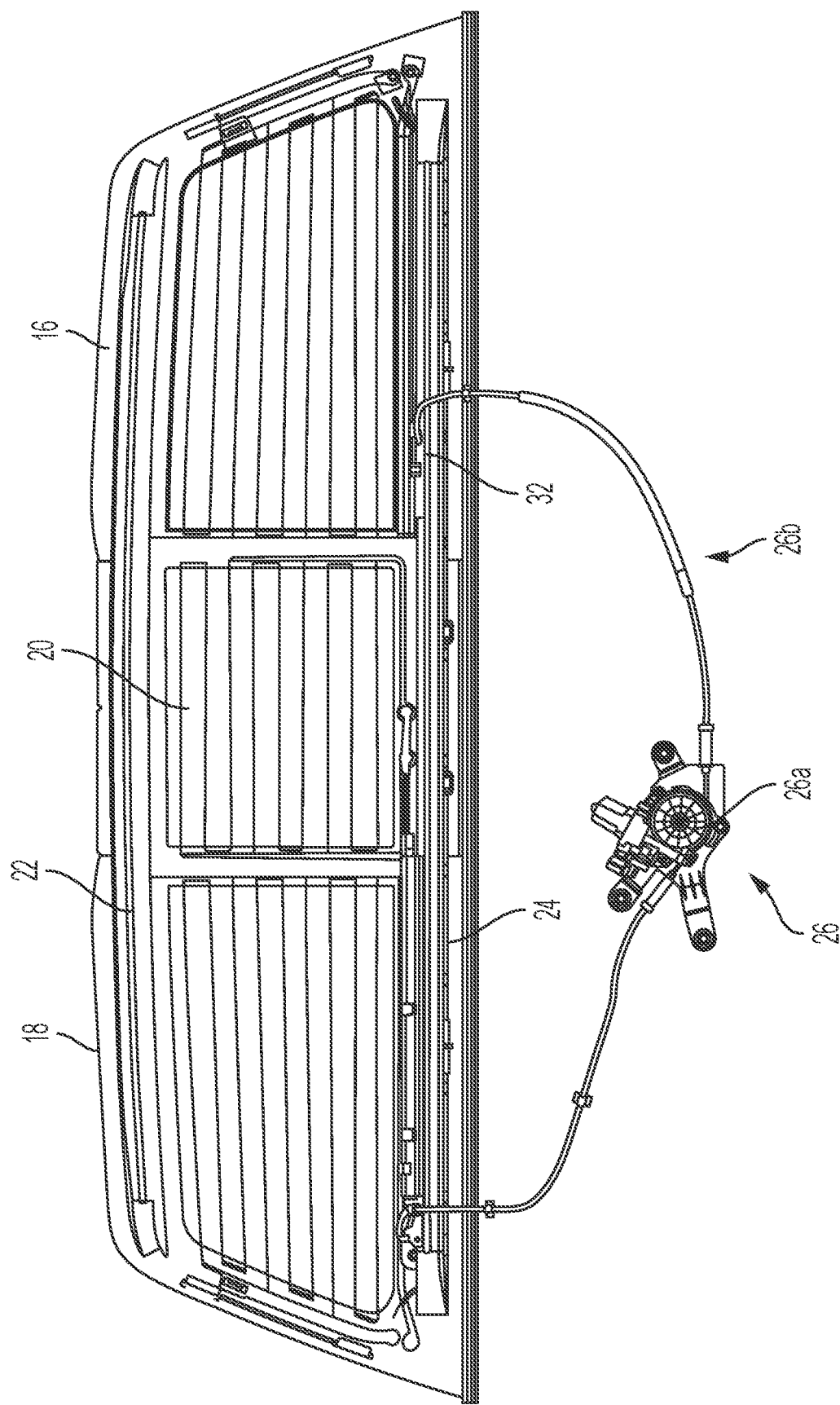
FIG. 3 is a plan view of the rear slider window assembly of FIG. 2.
Figure 4:
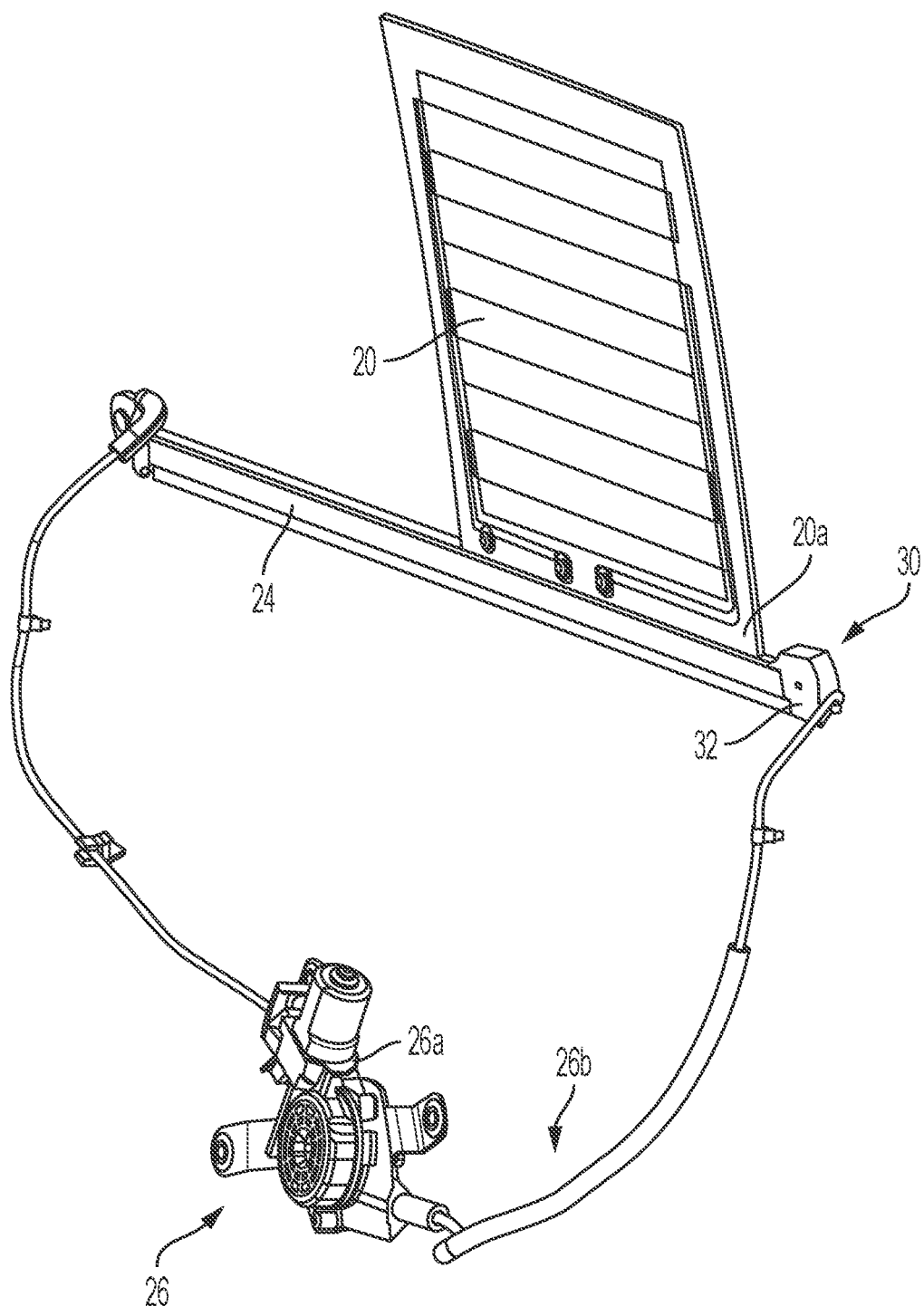
FIG. 4 is a perspective view of a movable window panel and lower rail or channel element and drive system of the rear slider window assembly of FIGS. 2 and 3.
Figure 5:
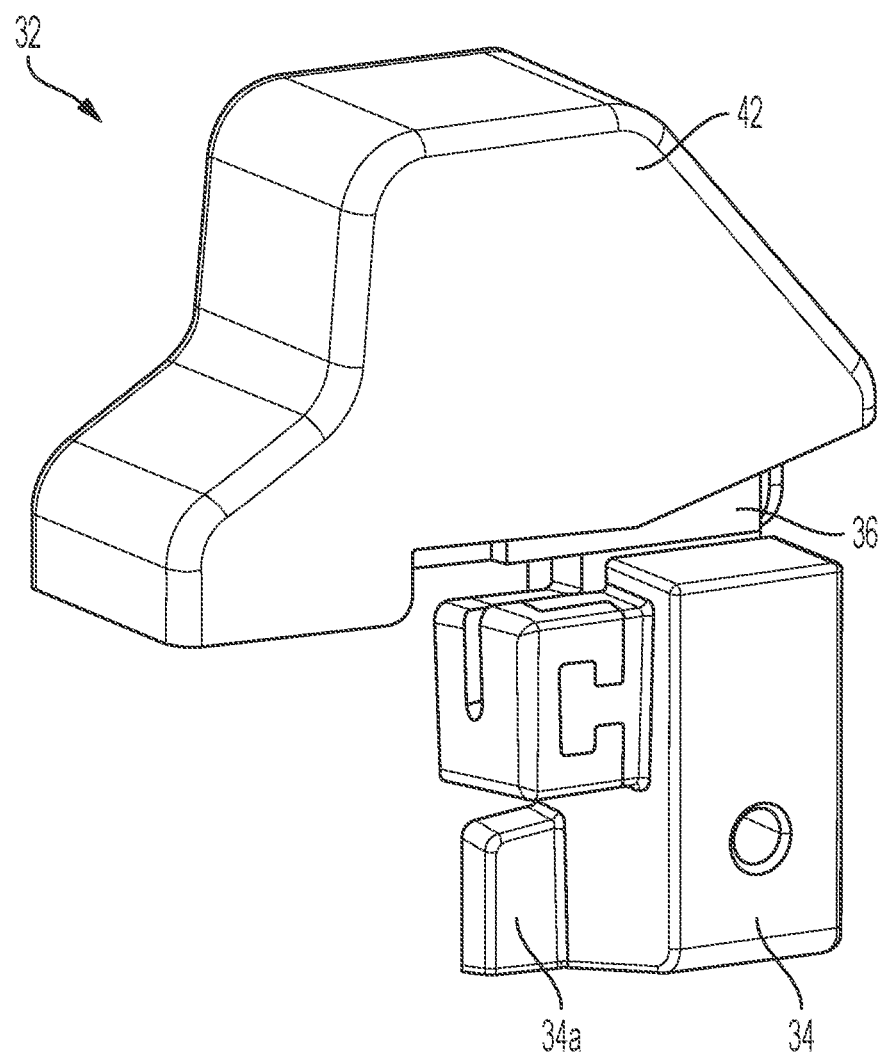
FIG. 5 is a perspective view of a switch assembly at an end stop of the lower channel element of the rear slider window assembly.

Referring now to the drawings and the illustrative embodiments depicted therein, a rear slider window assembly 10 of a vehicle 12 (such as a pickup truck or the like) includes a window frame 14, a fixed window panel or panels having an aperture that separates side window panels or portions 16, 18 and a movable window panel 20 that is movable relative to the window frame 14 and the fixed window panel between a closed position, where the movable window panel 20 is disposed at the aperture of the fixed window panel, and an opened position, where the movable window panel 20 is moved at least partially along the fixed window panel (FIGS. 1-4). The movable window panel 20 is movable along the frame 14 (such as along an upper rail or channel 22 and a lower rail or channel 24 of the frame) relative to the fixed window panel(s) via a drive system 26 that moves the movable panel in either direction to open and close the rear window, such as responsive to a user input or button or switch in the vehicle cabin.

The lower rail 24 comprises an elongated generally U-shaped channel portion disposed generally horizontally along the rear slider window and spanning at least part of each of the fixed window panels 16, 18. The lower edge region 20a (FIG. 4) of the movable window panel 20 is received in or attached to a carrier, which is movably received in, the channel portion of the lower rail 24 and is movable or slidable along the channel portion as the movable window panel 20 is moved between its opened and closed positions via operation of the drive system 26. The window assembly 10 includes a sensing system 30 for determining the position of the movable window panel, such as determining when the window panel is fully closed. The sensing system 30 comprises a switch assembly 32 disposed at an end of the channel portion of the lower rail 24, such as at an end cap or cable guide 34, and a bumper or stop element disposed at the respective end of the carrier. The switch assembly 32 detects the presence of the bumper and carrier to determine when the movable window panel is fully closed, as discussed below. In the illustrated embodiment, the switch device is embedded as a unit at the end stop or cable guide and is integrally formed with the end stop at the end of the channel of the lower rail, as also discussed below.

In the illustrated embodiment, window assembly 10 includes two fixed window panels or panel portions 16, 18 that are spaced apart so as to define an opening therebetween. The fixed window panels may comprise two separate spaced apart fixed window panels that define the opening therebetween (and with upper and lower appliqués or trim or filler panels or elements disposed at the upper and lower regions of the opening and between the fixed window panels), while remaining within the spirit and scope of the present invention. Optionally, the window assembly may comprise a hole-in-glass window configuration, where a single fixed glass panel has an aperture or hole or opening established therethrough to define separate spaced apart fixed window panels or panel portions, such as in a similar manner as the window assemblies described in U.S. Pat. No. 8,881,458, which is hereby incorporated herein by reference in its entirety.

The slider or movable window panel 20 is movable along the lower rail 24 and the upper rail 22 of the frame portion 14 to open and close the aperture or opening, such as in a manner similar to known slider window assemblies. The slider window panel 20 is disposed at the lower carrier, which may receive the lower perimeter edge region 20a of the slider window panel 20 therein and is slidably or movably received in the channel portion of the lower rail 24 of the frame portion 14. The upper rail 22 may comprise any suitable channel or rail element configured to slidably receive an upper edge portion of the movable window panel 20.

The movable or slider window panel 20 may be movable such as via manual pushing or pulling at the window panel and is movable in response to actuation of a drive motor 26a of the drive motor assembly or system 26, which may move cables or wires of cable assemblies 26b relative to the sheath of the cable assemblies 26b to impart horizontal movement of the carrier and slider window panel 20 along the rails 22, 24. Although shown as a cable drive system, the carrier and movable window panel may be moved along the rails via any suitable drive system, such as by utilizing aspects of the drive systems described in U.S. Pat. Nos. 10,501,977; 8,938,914; 7,073,293 and/or 6,955,009, and/or U.S. Publication Nos. US-2019-0383084; US-2008-0127563 and/or US-2004-0020131, and/or U.S. patent application Ser. No. 17/305,818, filed Jul. 15, 2021 (Attorney Docket DON02 P4234), which are all hereby incorporated herein by reference in their entireties The lower rail includes end caps or cable guides or guide portions disposed at the ends of the channel portion at or near opposite end regions thereof, whereby the cable (or other drive means) of the drive system 26 attaches at or is guided and retained at the guide portions. The end guides may utilize aspects of the end guides described in U.S. Pat. No. 8,938,914, which is hereby incorporated herein by reference in its entirety. Optionally, the drive system 26 may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. US-2004-0020131 and/or US-2008-0127563, which are all hereby incorporated herein by reference in their entireties.

Thus, the movable window panel 20 is movable along the upper and lower channels or rails between its opened and closed positions. The switch assembly 32 is part of the sensing system 30 that is operable to determine when the movable window panel 20 is at its fully closed position, so as to provide an indication to the driver of the vehicle equipped with the window assembly 10 to inform the driver that the window is fully closed. For example, when the window panel 20 is open, an indication light (such as a light emitting diode or LED or the like) at the instrument panel of the vehicle (or elsewhere in the vehicle cabin and viewable by the driver) will be activated to notify the driver that the window is opened (optionally, an audible indication device can also or otherwise be installed), and when the window is fully closed, the indicator (visual and/or audible) will be deactivated, thus indicating to the driver that the window is fully closed and latched.

As shown in FIGS. 5-9, the switch assembly 32 comprises the end stop 34 that is configured to be received at the end of the channel portion of the lower rail 24 at the end of the rail that corresponds generally to where the end of the carrier will be when the movable panel 20 is fully closed. The end stop 34 is received in the channel portion and includes a guide portion that guides and/or retains the cable or other drive element thereat. The end stop 34 includes a bumper or stop element 34a that extends along the channel portion for contacting the carrier of the movable window panel 20 and stopping further movement of the movable window panel 20 when the panel reaches the fully closed position (which also generally coincides with a latch element being engaged to latch the movable window panel in the closed position).

Figure 6:
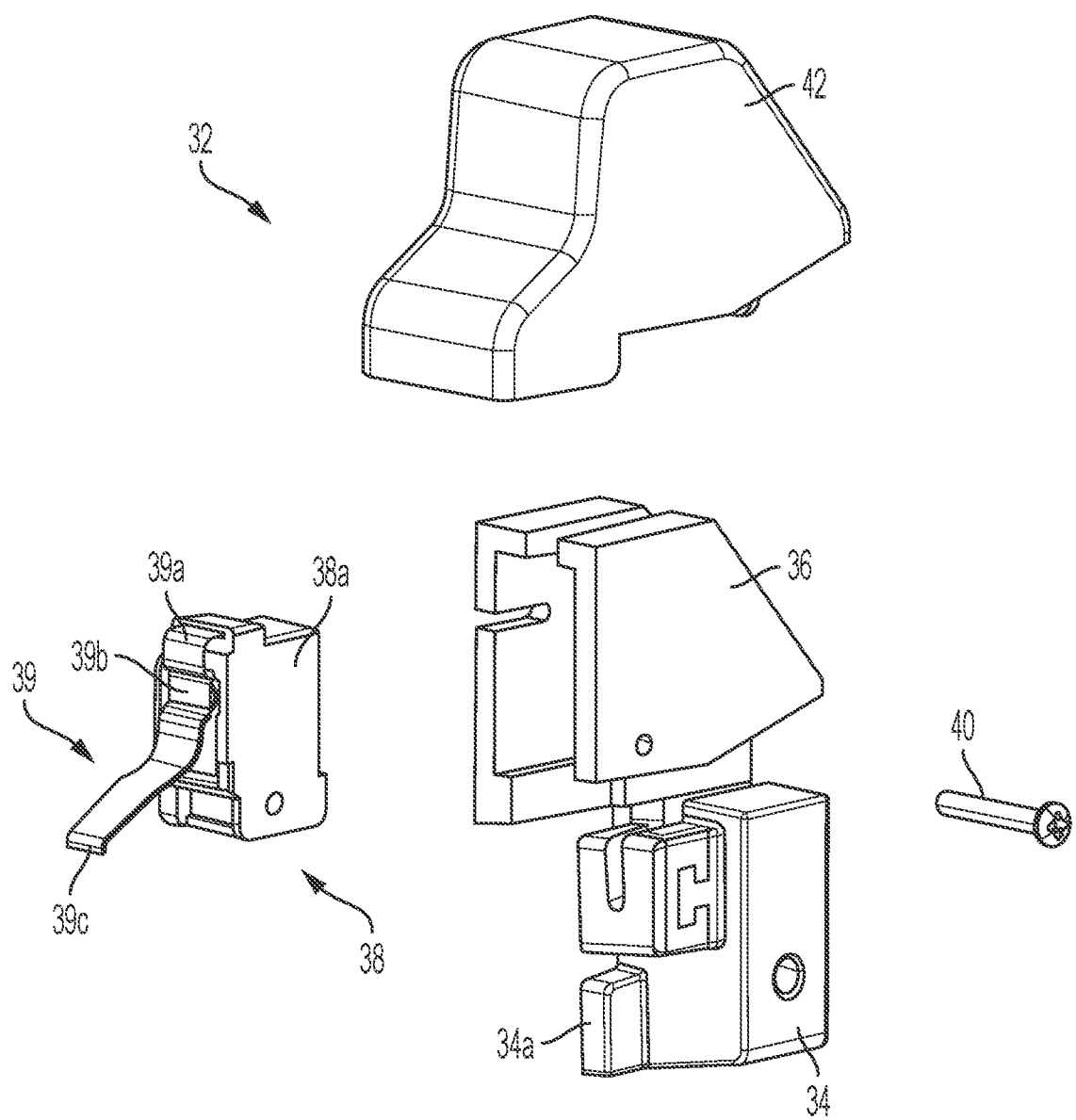
FIG. 6 is an exploded perspective view of the switch assembly.
Figure 7:
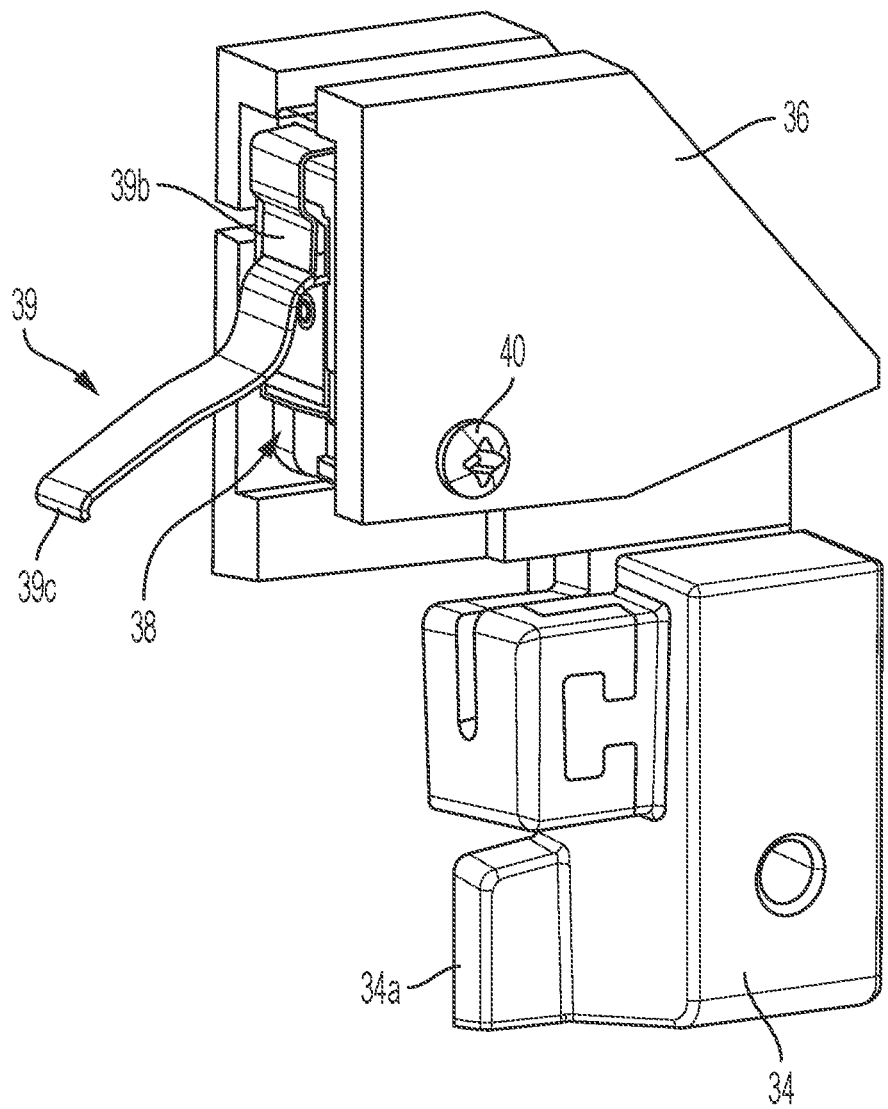
FIG. 7 is a perspective view of the switch assembly, with the cover removed to show additional details.
Figure 8:
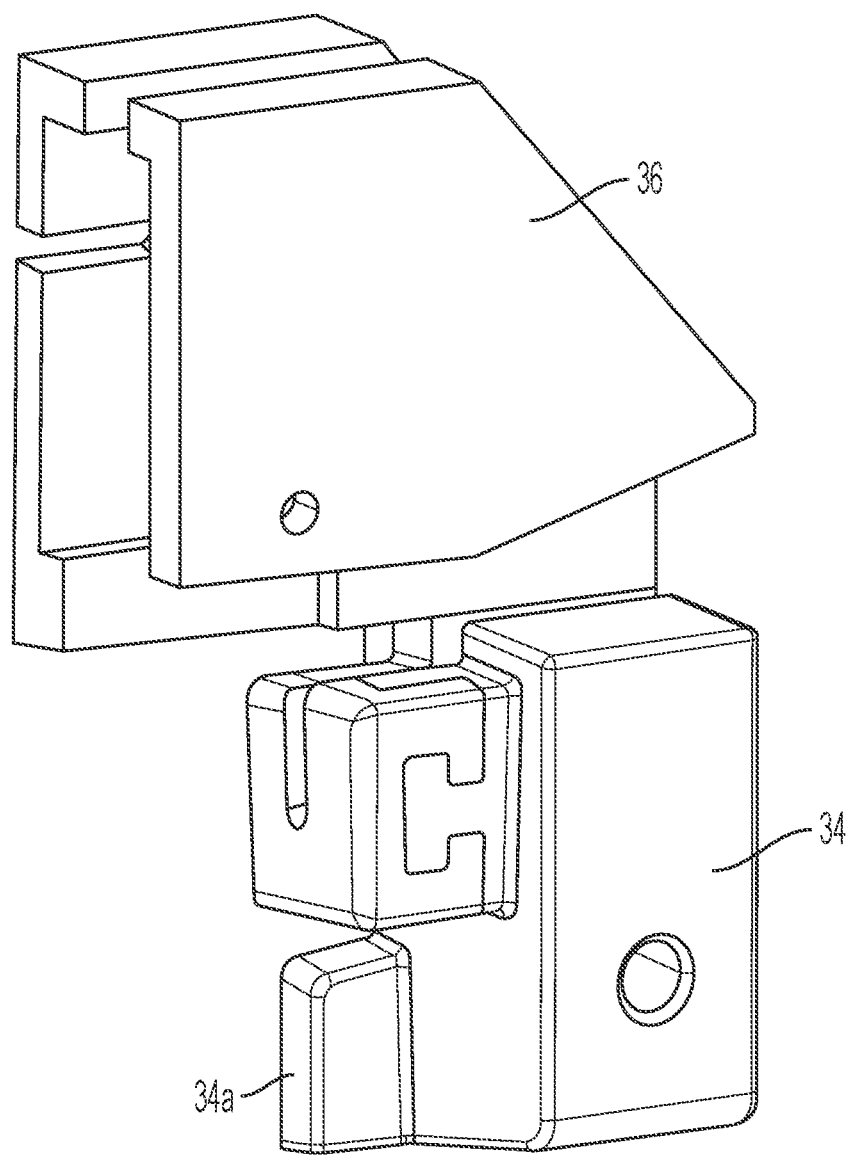
FIG. 8 is a perspective view of the housing and end stop of the switch assembly.
Figure 9:
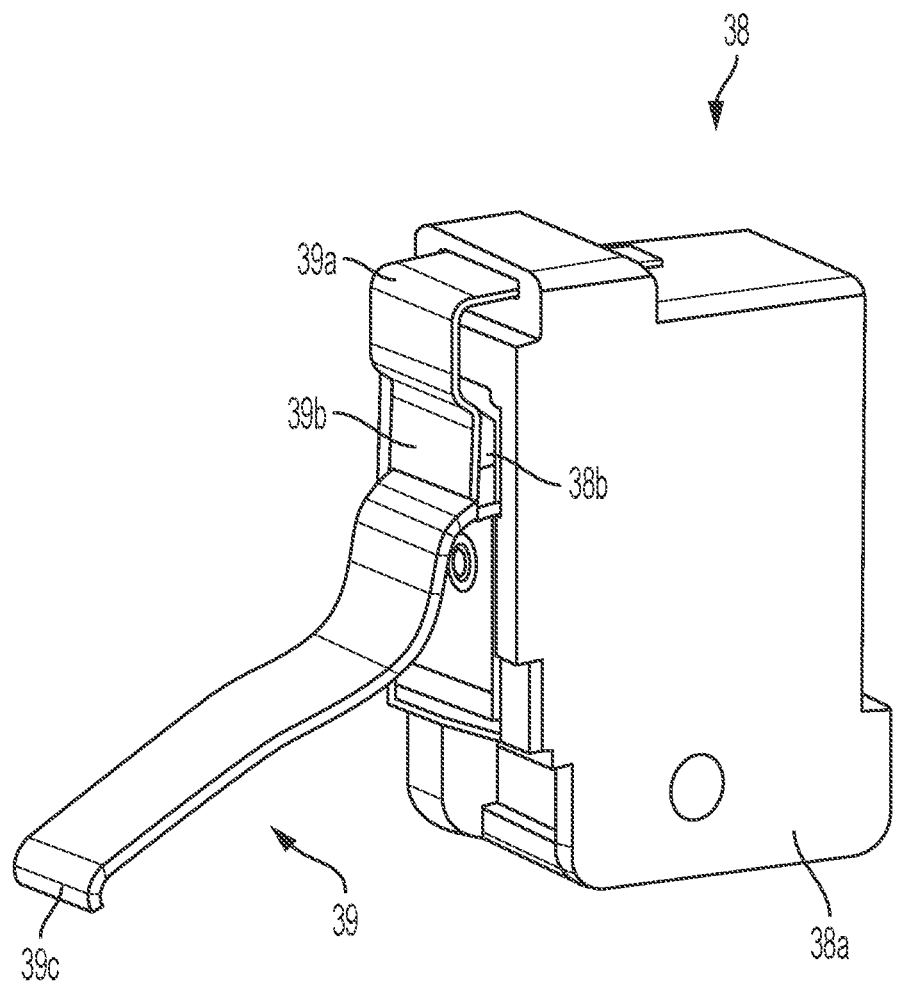
FIG. 9 is a perspective view of the switch device of the switch assembly.
Figure 10:
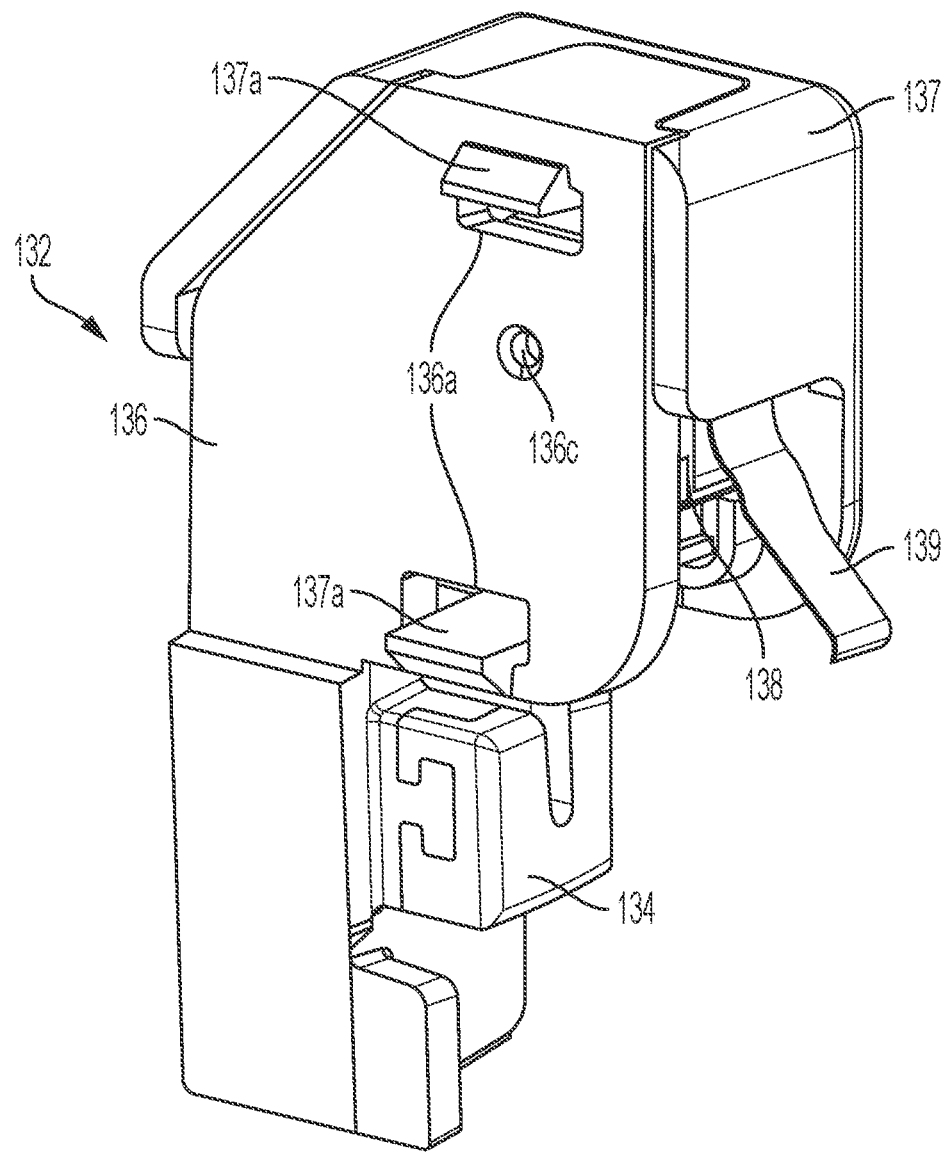
FIGS. 10 and 11 are perspective views of another switch assembly.
Figure 11:
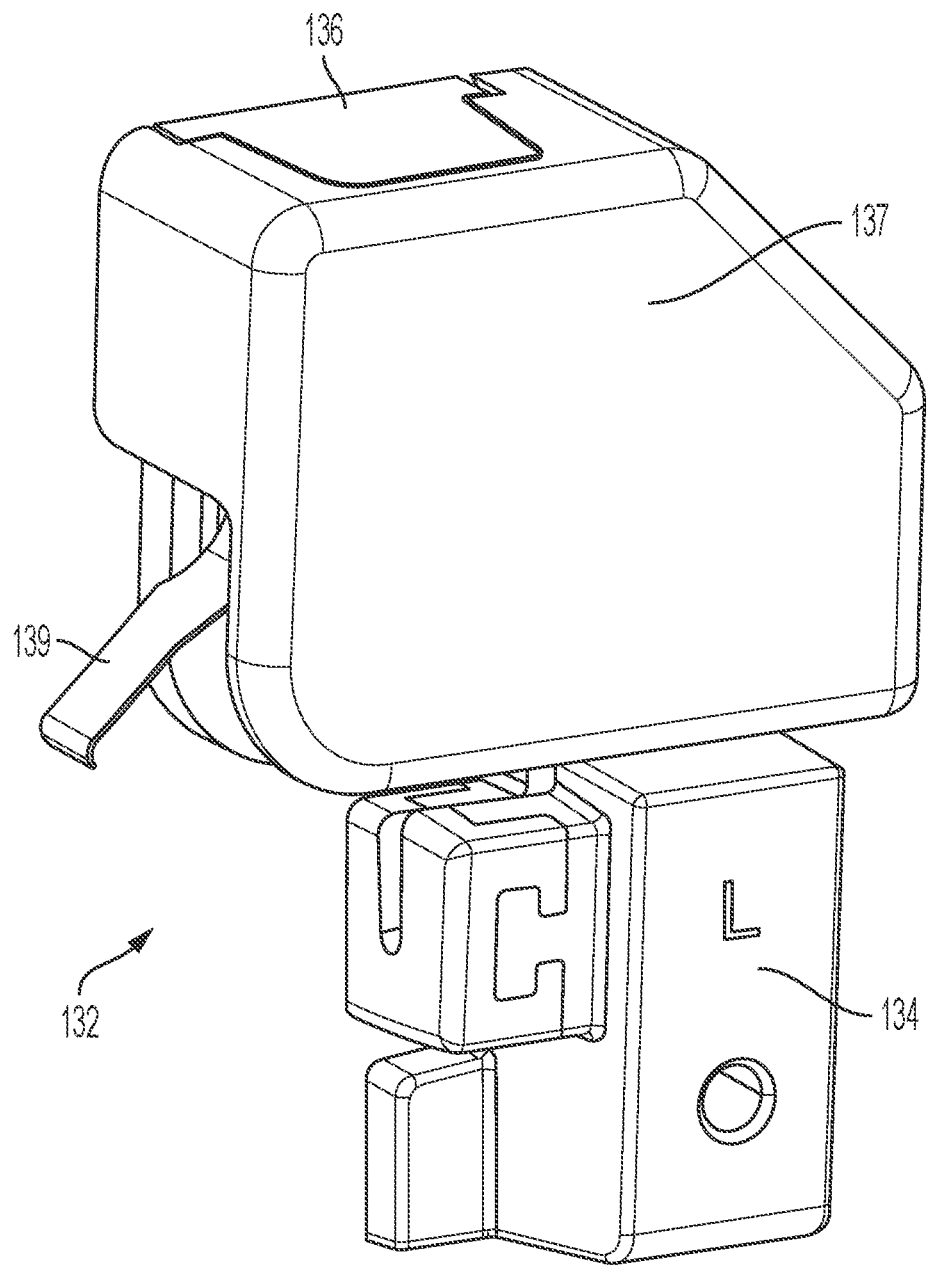
Figure 12:
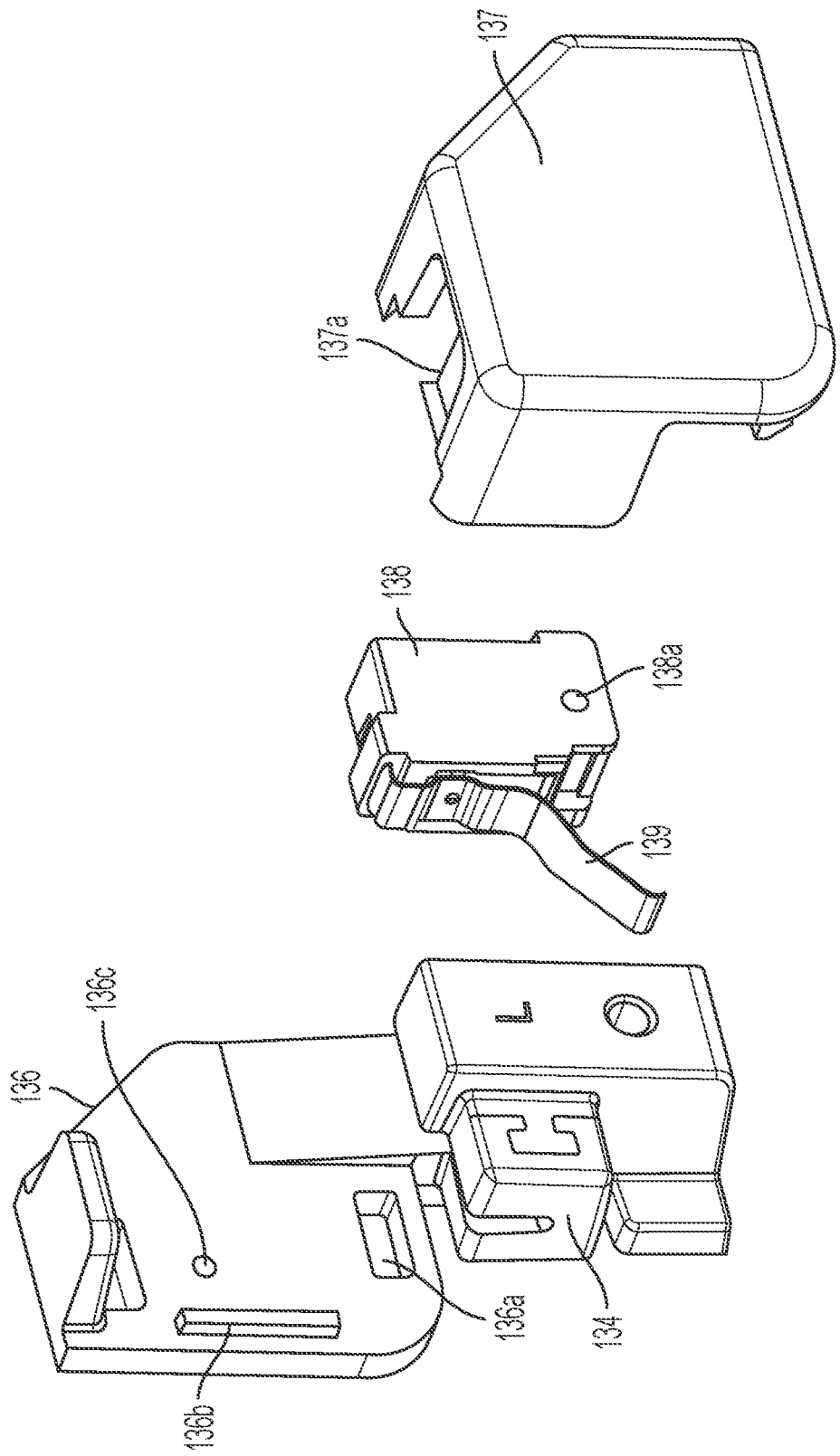
FIGS. 12 and 13 are exploded perspective views of the switch assembly.
Figure 13:
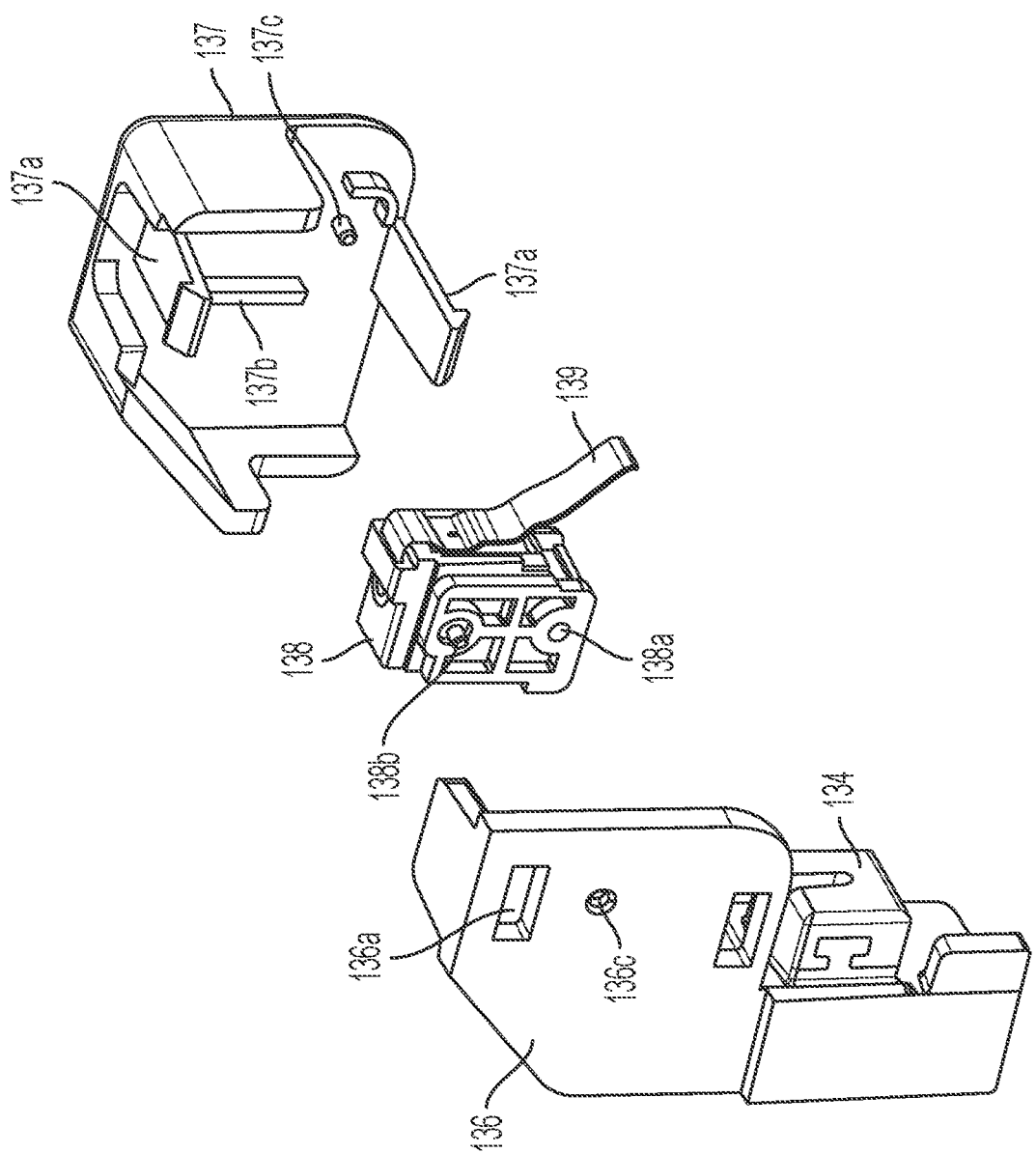

As shown in FIGS. 6 and 7, the switch assembly 32 includes a housing portion 36 that extends upward from the end stop 34, and that may be integrally formed (such as via the same injection molding process) with the end stop to provide a unitary end stop and housing construction. The housing portion 36 receives a switch device 38 therein, which is received at an opening of the housing 36 and that is pinned or secured at and within the housing 36, such as via a fastener or pin 40 or the like. An elastomeric cover or boot 42 is disposed over the housing 36 and the switch device 38 to encase the housing 36 and switch device 38, while allowing for flexing or deforming of the cover 42 to allow for actuation of the switch device 38.

The switch device 38 comprises an electronic switch device that has a movable contact element or switching element 39 that is movable relative to a housing portion 38a and an electronic switch or circuit element 38b. The contact element 39 is movably mounted at the housing portion 38a (such as at an end portion 39a of the contact element 39 that is attached at the housing portion) and includes an actuating portion 39b that, when the contact element 39 is moved relative to the housing 38a, presses the circuit element 38b to actuate the switch (i.e., to close a circuit of the switch). The contact element 39 includes an outer or distal end 39c that is distal from the end 39a that attaches at the housing portion 38a, with the distal end 39c extending away from the housing portion 38a along the lower rail 24 and optionally downwardly so as to be disposed partially within the lower rail 24 when the end stop portion 34 is attached at the channel portion of the lower rail 24.

The contact element 39 may comprise any suitable element, such as a flexible metallic element or the like that flexes when the distal end 39c is contacted by the carrier of the movable window panel 20 as the movable window panel 20 is moved to the closed position. Optionally, the contact element 39 may comprise a non-flexible element that is pivotally attached at the housing portion. The cover or boot 42 covers the switch device 38 to conceal and protect the switch device 38 and the contact element 39, while allowing for flexing or moving of the contact element 39 when the movable window panel 20 is closed and presses against the contact element via engagement with the cover 42.

The distal end 39c of the contact element extends a predetermined amount beyond the stop element 34a of the end stop, so that the contact element 39 is contacted and moved to actuate the switch device 38 slightly before the carrier contacts the stop element 34a, which limits further movement of the movable window panel 20 in that direction. For example, the distal end 39c of the contact element 39 may extend an amount so that when the portion of the carrier that contacts the cover 42 at the contact element 39 makes initial contact with the cover 42 at the distal end 39c of the contact element 39, the other portion of the carrier that contacts the stop element 34a is spaced from the stop element 34a by one millimeter or thereabouts (or any sufficient distance that allows for the contact element to sufficiently flex or move to actuate the switch device before the carrier is stopped by the stop element). The degree of extension of the distal end 39c of the contact element 39 as compared to the stop element 34a of the end stop 34 is selected based in part on the degree of movement of the contact element 39 that is required to actuate the switch 38 and based in part on the shape of the end of the carrier and relative locations of the portions of the carrier end that contact the cover 42 and the stop element 34a.

The switch device 38 is electrically connected to a control device of the sensing system 32, such as a control device disposed in the cabin of the vehicle. The control device determines when the switch device 38 is actuated (i.e., when the movable window panel is fully closed), and may provide an indication to the driver when the panel 20 is closed and/or may provide an indication to the driver when the panel 20 is opened. The switch device 38 may be electrically connected to the control device via electrical wires attached at the switch device 38 that electrically connect to a wire harness of the vehicle when the window assembly 10 is installed at the vehicle, or via electrically conductive traces along the fixed window panel 16, 18, which may extend to the electrical connections of the window assembly for electrically connecting the heater grids of the window assembly and/or the drive system of the window assembly to one or more wire harnesses of the vehicle when the window assembly is installed at the vehicle.

In the illustrated embodiment, the lower rail 24 comprises a unitarily formed (such as via molding or injection molding or the like) rail having a generally U-shaped channel portion that is arranged generally horizontally across the rear slider window assembly 10. The lower rail 24 may be formed via any suitable forming means and may comprise any suitable material or materials. For example, the lower rail 24 may comprise a rigid or substantially rigid molded polymeric channel (such as a polyvinylchloride material or PC—ABS or the like), and preferably a rigid polymeric material or engineered plastic material. The channel portion is an elongated generally U-shaped channel having a base or lower wall and a pair of spaced apart generally vertical walls extending upwardly from the base or lower wall. The end stop portion 34 of the switch assembly 32 is disposed at the end of the channel portion and extends upward from the base wall and spans between the spaced apart walls of the channel so as to close the end regions of the channel with the cable guide, with the housing portion 36 that houses the switch device 38 disposed above the channel portion.

Thus, the switch assembly 32 is part of the end stop (and integrally formed with the end stop) at the end of the channel portion of the lower rail 24. The switch device 38 is disposed within a housing portion 36 that is integrally formed with the end stop 34 and has a contact element or switch element 39 that extends from the housing portion 36 and end stop 34 along the lower rail 24 toward the opening and toward the movable window panel 20. The contact element 39 extends downward so as to be along the lower rail 24 and optionally within the channel portion of the lower rail 24, with the housing portion 36 and switch device 38 and contact element 39 encased by the elastomeric or flexible cover or boot 42. The end of the boot 42 at the distal end 39c of the contact element 39 is contacted by the end of the carrier (such as by a bumper or cushioning element at the end of the carrier) when the movable window panel 20 is fully closed. When the boot 42 (at the contact element) is contacted by the carrier, the boot 42 flexes and the contact element 39 flexes or moves to actuate the switch or circuit element to indicate to the controller that the movable window panel 20 is fully closed.

Optionally, the switch device may have a two piece housing construction with one of the housing portions integrally formed with the end stop and with the switch device attached at one of the housing portions and encased at the housing when the housing portions are joined together (such as via snap attachment). For example, and such as shown in FIGS. 10-18, a switch assembly 132 includes an end stop 134 that is configured to be received at the end of the channel portion of the lower rail at the end of the rail that corresponds generally to where the end of the carrier will be when the movable panel is fully closed. The end stop 134 is received in the channel portion and includes a guide portion that guides and/or retains the cable or other drive element thereat. The switch assembly 132 includes a housing portion 136 that extends upward from the end stop 134, and that may be integrally formed (such as via the same injection molding process) with the end stop to provide a unitary end stop and housing portion construction. The housing portion 136 comprises a wall portion of the housing that receives the switch device 138 therein, whereby the switch device is housed or encased via attachment of a cover or second housing portion 137 at the wall or housing portion 136. In the illustrated embodiment, the wall housing portion 136 includes slots or apertures 136a, guide or locating ribs 136b and a guide hole 136c (for locating the switch device 138), while the cover or housing portion 137 includes flexible tabs 137a, guide or locating ribs 137b and a guide pin or locating pin 137c (for locating the switch device 138).

Figure 14:
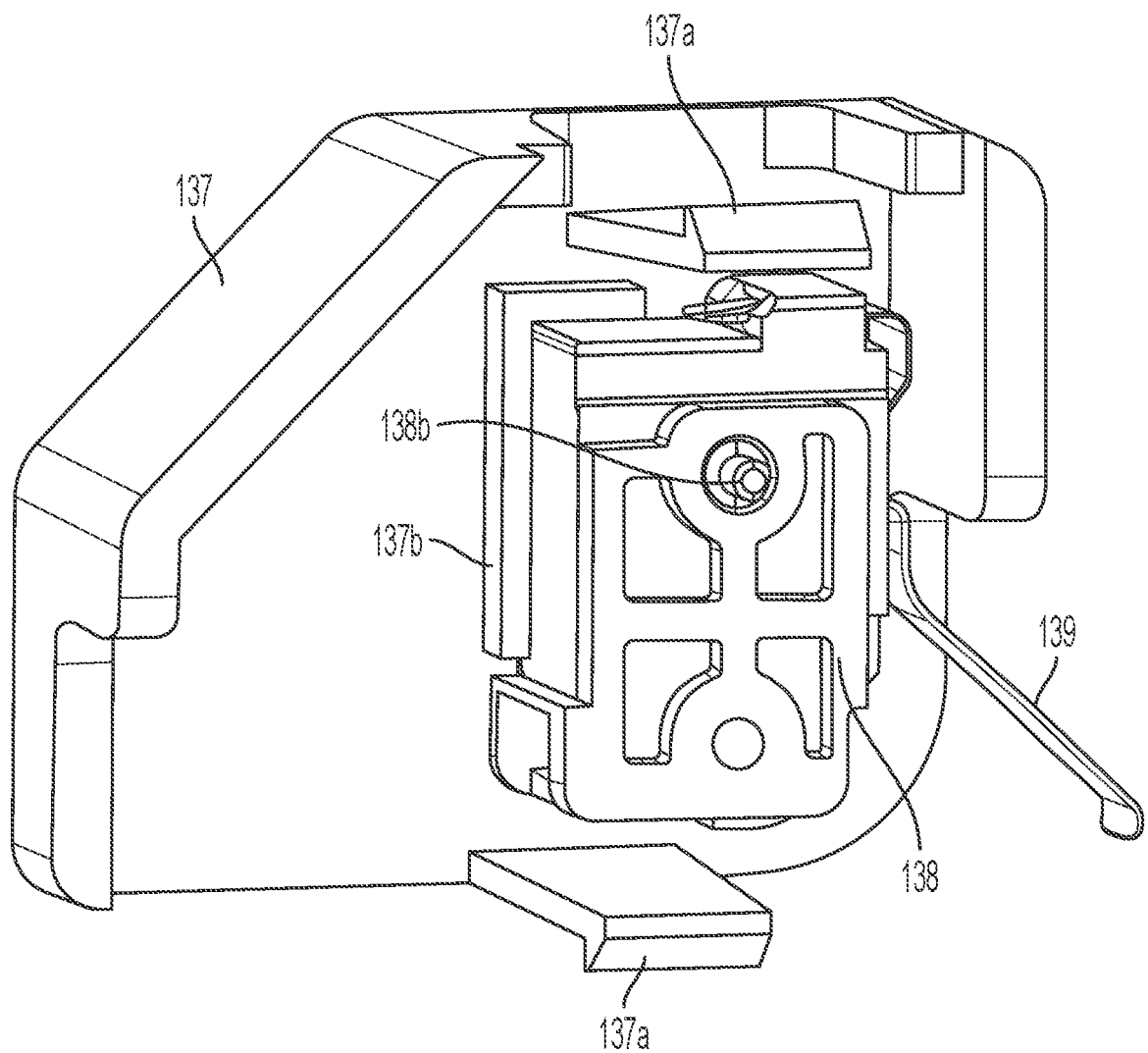
FIG. 14 is a perspective view of the switch device as disposed in a housing portion of the switch assembly.
Figure 15:
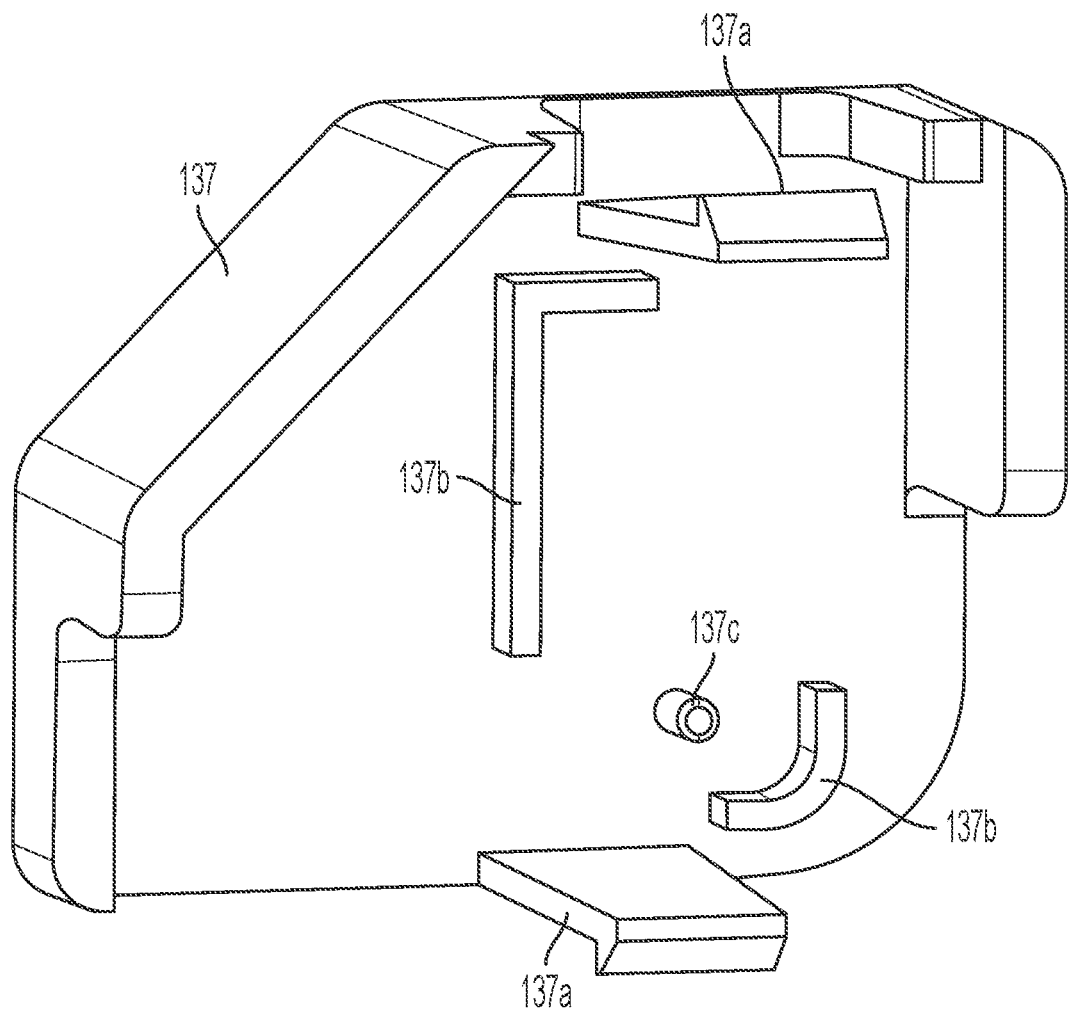
FIGS. 15 and 16 are perspective views of the housing portion of FIG. 14.
Figure 16:
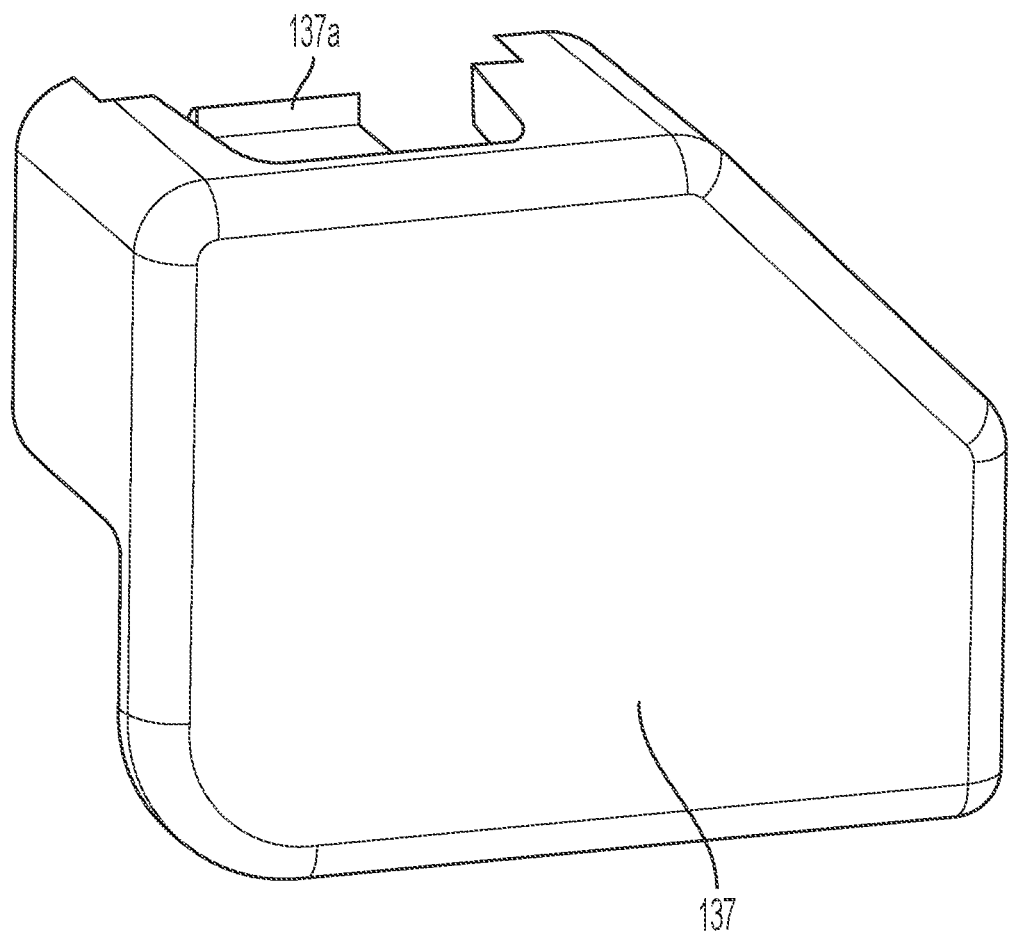
Figure 17:
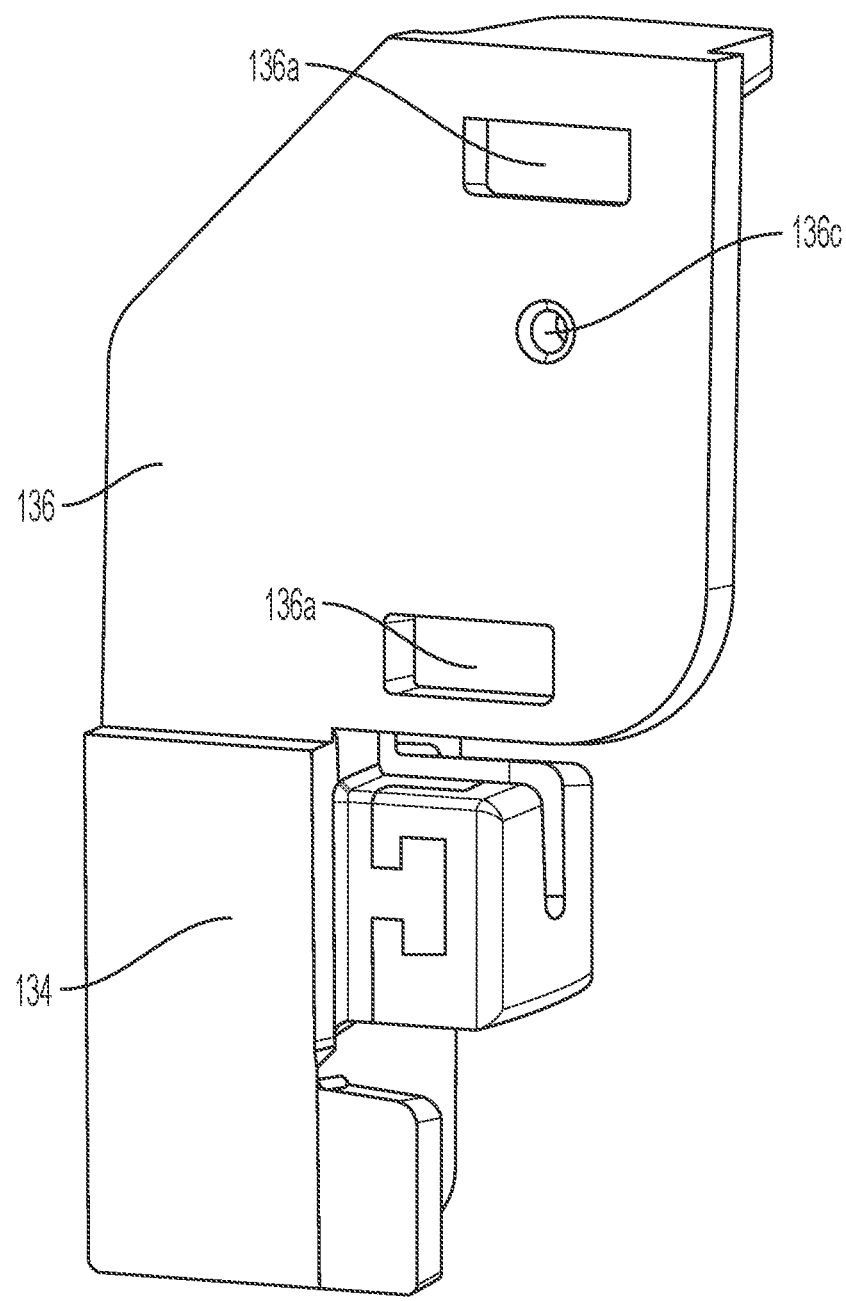
FIGS. 17 and 18 are perspective views of the base portion of the switch assembly.
Figure 18:
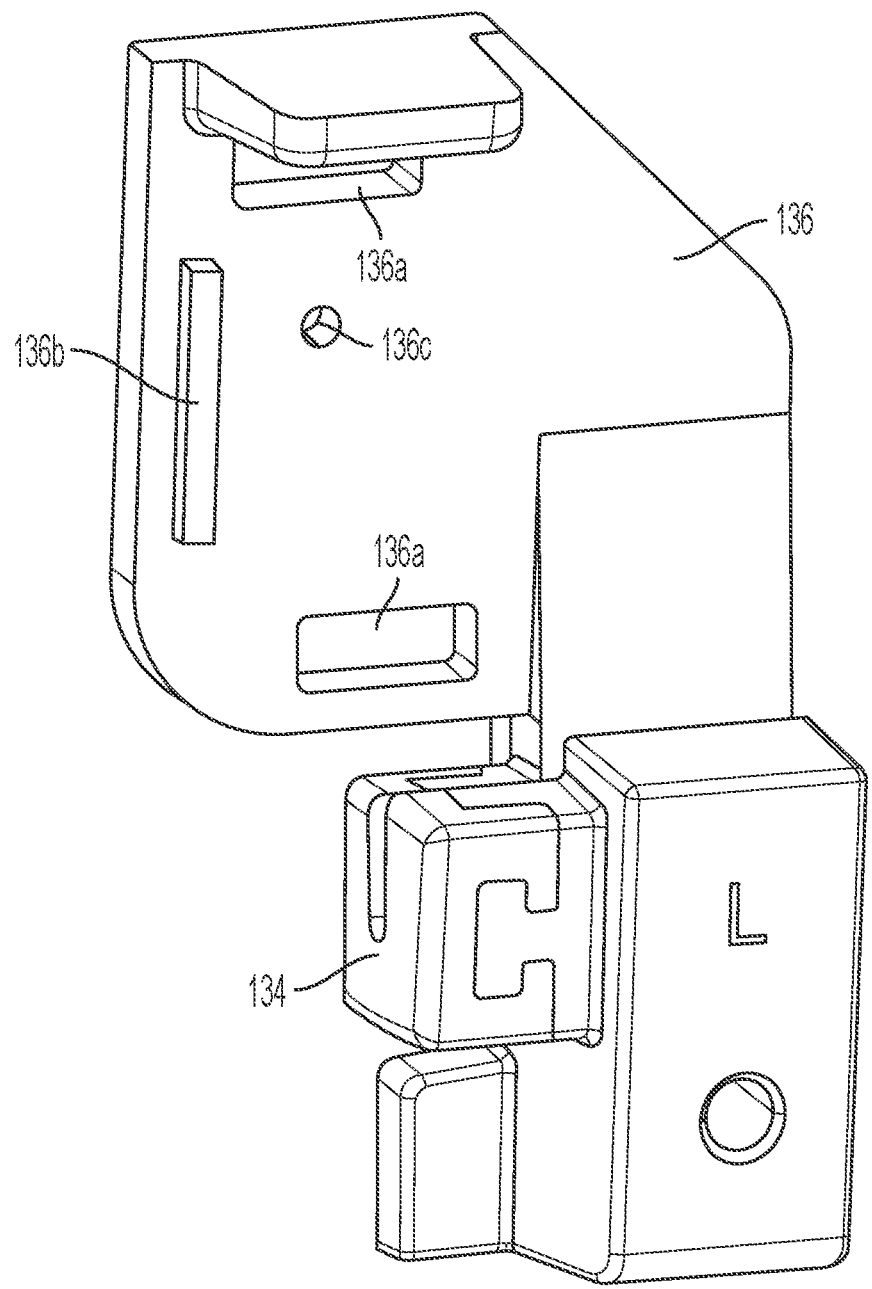
Figure 19:
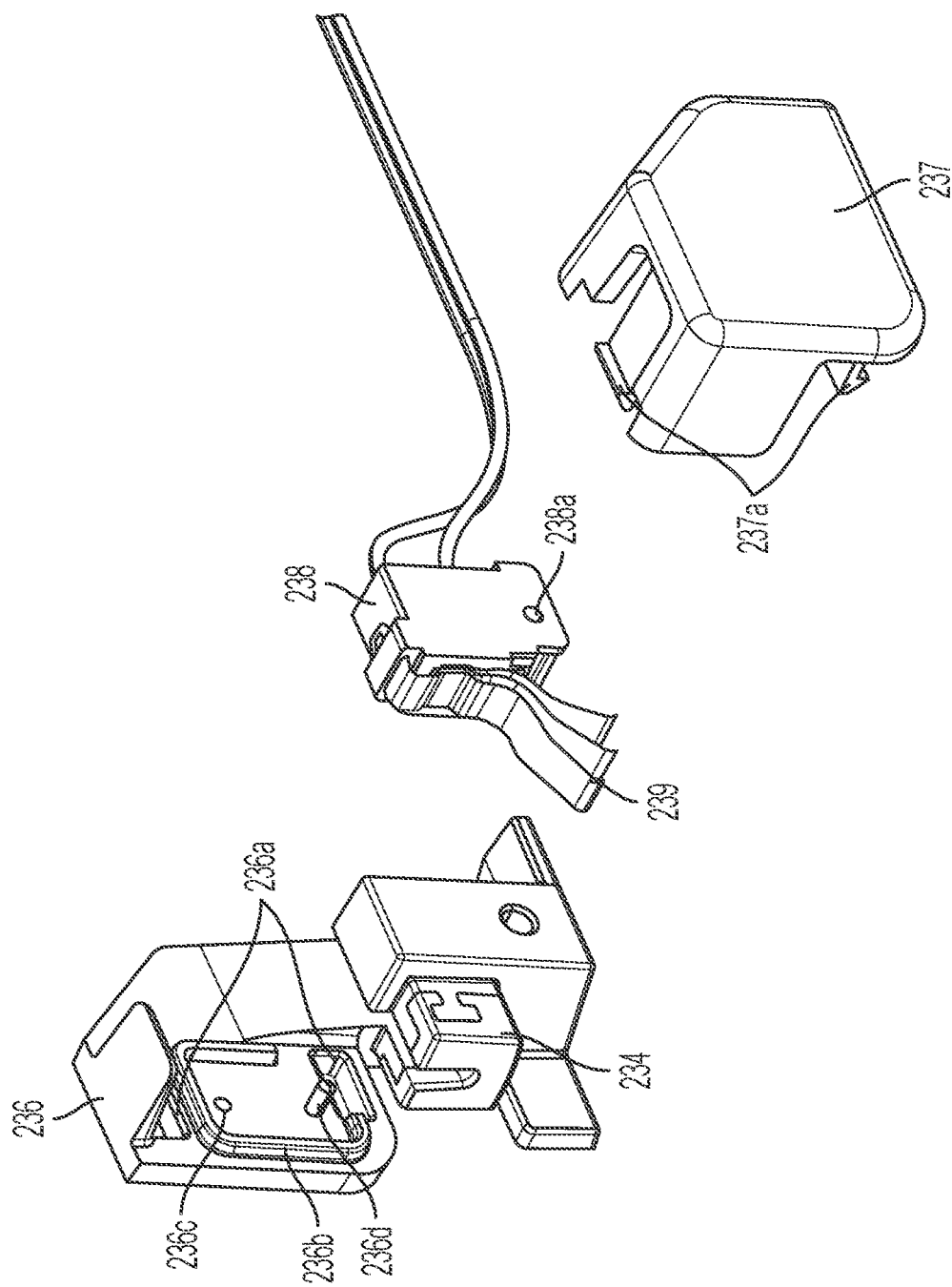
FIG. 19 is an exploded view of another switch assembly.
Figure 20:
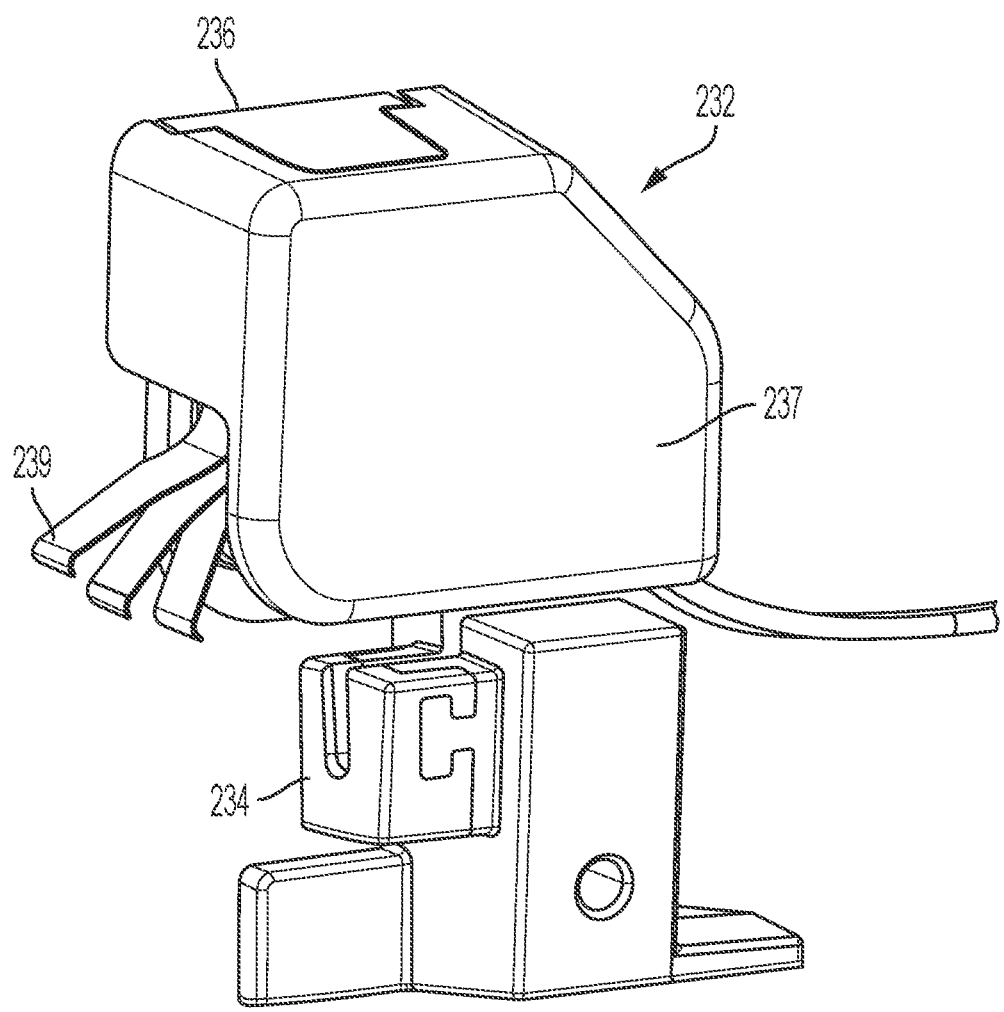
FIG. 20 is a perspective view of the switch assembly of FIG. 19.

As shown in FIG. 14, the switch device 138 is located at the cover portion 137 and positioned via the locating ribs 137b and the guide pin 137c (which is received in an aperture or hole 138a at the switch device 138. When the switch device 138 is located at the cover portion 137, the contact element 139 protrudes from the cover portion 137. The guide or locating elements of the cover portion 137 are formed to correspond with portions of the switch device 138 so that the switch device 138 is properly located at the cover portion 137 and retained thereat.

The cover portion 137 (with the switch device attached thereat) is then snap-attached at the wall housing portion 136 via engagement of the flexible tabs 137a with the slots or apertures 136a of the wall housing portion. When so attached, a locating pin 138b of the switch device 138 is received at the locating hole 136c of the wall portion 136. The locating elements 136b, 136c, 137b, 137c of the wall portion 136 and the cover portion 137 function to hold the switch device in the housing, such that the contact element 139 protrudes through a slot or aperture formed by the housing portions 136, 137. The switch assembly 132 provides for enhanced assembly, since the switch device 138 may be readily positioned at the cover element 137 and the cover element 137 (with the switch positioned thereat) may be readily snap-attached at the wall portion 136 to position the switch device above the end stop portion. The switch device 138 may thus be disposed at and encased in the housing without use of fasteners, such as separate pins or screws or the like.

As discussed above, the movable contact element 139 of the switch device 138 is movable relative to the housing portion and an electronic switch or circuit element and includes an actuating portion that, when the contact element 139 is moved relative to the housing, presses the circuit element of the switch device to actuate the switch (i.e., to close a circuit of the switch). The contact element 139 includes an outer or distal end that is distal from the end that attaches at the housing portion of the switch device, with the distal end extending away from the housing along the lower rail and optionally downwardly so as to be disposed partially within the lower rail when the end stop portion 134 is attached at the channel portion of the lower rail.

Optionally, the wall portion of the housing of the switch assembly may include the guide pin and locating ribs for locating the switch within the housing. For example, and such as shown in FIGS. 19-22, a switch assembly 232 includes an end stop 234 that is configured to be received at the end of the channel portion of the lower rail at the end of the rail that corresponds generally to where the end of the carrier will be when the movable panel is fully closed. The end stop 234 is received in the channel portion and includes a guide portion that guides and/or retains the cable or other drive element thereat. The switch assembly 232 includes a housing portion 236 that extends upward from the end stop 234, and that may be integrally formed with the end stop (such as via the same injection molding process that forms the end stop) to provide a unitary end stop and housing portion construction. The housing portion 236 comprises a wall portion of the housing that receives the switch device 238 therein, whereby the switch device is housed or encased via attachment of a cover or second housing portion 237 at the wall or housing portion 236.

The wall portion 236 includes slots or apertures 236a configured to receive corresponding flexible tabs 237a of the cover portion 237. The wall portion 236 further includes (i) guide or locating ribs 236b configured to trace or at least partially circumscribe an outer edge of the switch device 238 and (ii) a guide hole 236c configured to receive a guide pin of the switch device 238. The wall portion also includes a guide pin 236d configured to be received by a guide hole 238a of the switch device 238 for locating the switch device within the housing.

Thus, the switch device 238 may be disposed at the wall portion 236 such that the guide pin 236d is received at the guide hole 238a of the switch device, the locating ribs 236b circumscribe and/or engage the outer edge of the switch device 238, and the guide hole 236c receives the guide pin of the switch device 238, to locate the switch device 238 at the housing. The cover portion 237 may then be snap attached at the wall portion via the flexible tabs 237a received in the corresponding apertures 236a to retain the switch device within the housing. The wall portion 236 and cover portion 237 cooperate to form an aperture through which a contact element 239 of the switch device 238 may protrude to sense or engage or receive the carrier element or movable window panel when the movable window panel is in the closed position.

Figure 21:
FIG. 21 is a perspective view of the switch assembly of FIG. 19 with an electrical connector extending therefrom.

As shown in FIG. 21, the switch assembly 232 may include an electrical connector assembly 244 for electrically connecting the switch assembly at the vehicle when the window assembly is installed at the vehicle. The connector assembly 244 includes electrical wires or cables 244a connected at the switch device 238 and a connector 244b at a distal end of the wires 244a distal from the switch device 238 for connecting to the vehicle wire harness. Thus, the switch assembly 232 may be electrically powered and communicate signals, such as to indicate that the movable window panel is in the closed position, via the electrical connector assembly 244.

Figure 22:
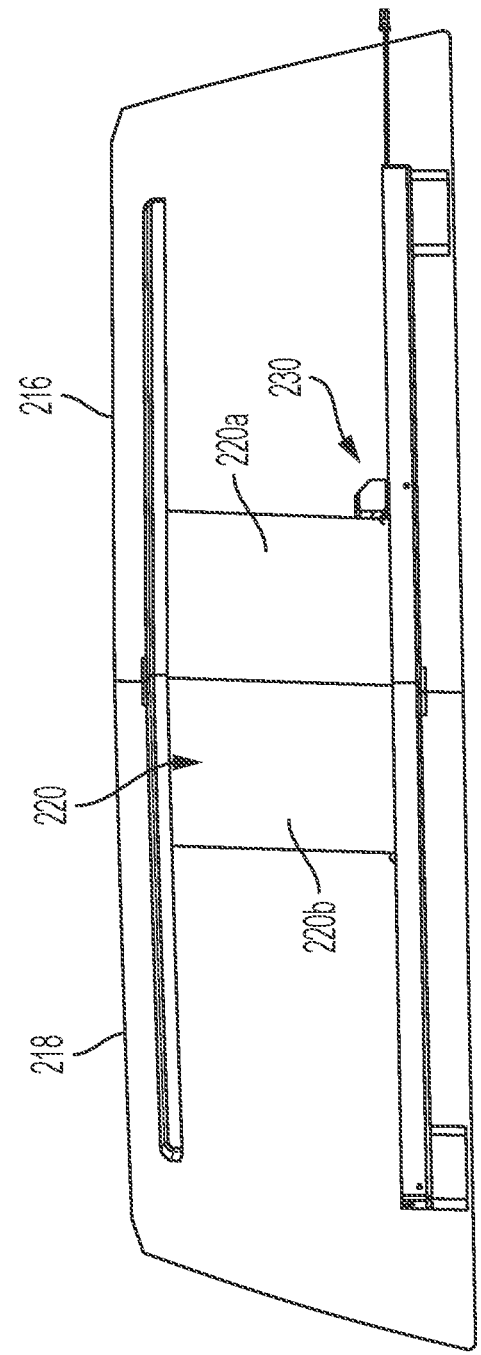
FIG. 22 is a perspective view of a rear slider window assembly with the switch assembly of FIG. 19.

As shown in FIG. 22, the movable window panel may comprise a two-piece movable window panel 220, such that a first side window or window portion 220a and a second side window or window portion 220b may be movable relative to one another along respective sides 216, 218b of the fixed window panel when the movable window panels are moved between the closed and opened positions. For example, the first side 220a may be movable along the first side 216 of the fixed window panel and the second side 220b may be movable along the second side 218 of the fixed window panel. The two sides are configured to move in opposite directions from one another, such that movement of one side may result in corresponding opposite movement of the other side (such as by utilizing aspects of U.S. Pat. No. 10,501,977 and/or U.S. Publication No. US-2020-0240191, which are hereby incorporated herein by reference in their entireties). The sensor system 230 may have the switch assembly disposed at one side (FIG. 22) for determining when the movable window panels are in the closed position. Optionally, the sensor system may include a switch assembly disposed at each side of the two-piece movable window panel.

In the illustrated embodiment, the fixed window panels each include an electrically conductive heater grid or other heating element or electrically operable element established at the window panels (such as at or on an interior surface of the window panels) and the movable window panel includes an electrically conductive heater grid or other heating element or electrically operable element established at the window panel (such as at or on an interior surface of the movable window panel). The fixed window heater grids are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels. The movable panel heater grid is electrically connected to the power source (and may be electrically connected to electrical terminals or elements at one of the fixed window heater grids of the fixed window panels) and may be electrically powered to heat or defrost or defog the movable window panel. The heater grids comprise a plurality of electrically conductive traces that extend across the respective window panels between respective busbars to provide enhanced and more uniform heating and defrosting/defogging of the window panel, as also discussed below. The heater grid of the movable window panel may be powered in a manner that allows for heating or defogging or defrosting of the movable window panel irrespective of whether the movable window panel is opened or partially opened or closed. For example, the electrical connections may be made via a flexible connector or wire or cable or the like, such as by utilizing aspects of the rear slider window assemblies described in U.S. Pat. Nos. 10,843,644; 10,524,313; 9,579,955; 8,938,914; 8,881,458 and/or 8,402,695, which are hereby incorporated herein by reference in their entireties. Optionally, the heater grid of the movable window panel may be powered only when in its closed position and/or via any suitable powering means.

The benefits of embodiments of the present invention may also be realized in sliding window constructions where an aperture is created in a fixed window panel and where a movable window panel can be made to open or close the aperture. Slider windows of this type are disclosed such as in U.S. Pat. Nos. 8,915,018 and/or 8,881,458 and/or U.S. Publication No. US-2003-0213179, which are hereby incorporated herein by reference in their entireties. The benefits of embodiments of the present invention may also be realized in vehicular movable window assemblies other than a rear slider window assembly for a pickup truck or the like, such as (for example) a slider window assembly suitable for use as a movable side window for a vehicle such as a van or a bus.

Optionally, the window assembly or assemblies of the present invention may utilize aspects of the window assemblies described in U.S. Pat. Nos. 9,731,580; 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2008-0127563; US-2006-0107600; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular slider window assembly, the vehicular slider window assembly comprising:
    a frame portion having an upper rail and a lower rail;
    a fixed window panel, the fixed window panel having an opening, wherein the upper and lower rails are fixedly attached to an interior surface of the fixed window panel;
    a movable window panel that is movable along and between the upper rail and the lower rail, wherein the movable window panel is movable between a closed position, where the movable window panel closes the opening, and an opened position, where the movable window panel is located at least partially along the fixed window panel away from the opening;
    a carrier disposed at a lower perimeter edge region of the movable window panel, wherein the carrier is received in a channel portion of the lower rail and moves along the channel portion of the lower rail with the movable window panel as the movable window panel is moved between the opened position and the closed position;
    a sensing system operable to determine when the movable window panel is in the closed position and when the movable window panel is not in the closed position, wherein the sensing system comprises a switch assembly that is actuated when the movable window panel is in the closed position;
    wherein the switch assembly comprises a switch device disposed within a housing, and wherein at least a first portion of the housing is part of an end stop;
    wherein the end stop is disposed at an end of the channel portion of the lower rail, and wherein the end stop is configured to limit movement of the carrier along the channel portion when the movable window panel is moved to the closed position;
    wherein the switch device comprises a contact element that extends along the channel portion of the lower rail, and wherein, when the movable window panel is moved to the closed position, the contact element moves to actuate the switch device;
    wherein, when the movable window panel is not in the closed position, the contact element does not actuate the switch device; and
    wherein, responsive to the switch device not being actuated and the sensing system determining that the movable window panel is not in the closed position, the sensing system generates a first output signal to alert a driver of a vehicle equipped with the vehicular slider window assembly that the movable window panel is not in the closed position.

2. The vehicular slider window assembly of claim 1, wherein the sensing system generates a second output signal different than the first output signal responsive to determining that the movable window panel is in the closed position.

3. The vehicular slider window assembly of claim 1, wherein the movable window panel is movable between the opened and closed positions by a cable drive system, and wherein cables of the cable drive system are guided by cable guides at opposite ends of the channel portion of the lower rail, and wherein the end stop of the switch assembly comprises one of the cable guides.

4. The vehicular slider window assembly of claim 1, wherein the end stop is configured to contact the carrier when the movable window panel is moved to the closed position, and wherein, when the movable window panel is moved to the closed position and the first portion contacts the carrier, the contact element is moved by the carrier to actuate the switch device.

5. The vehicular slider window assembly of claim 1, wherein the fixed window panel comprises first and second fixed window panels having the opening therebetween.

6. The vehicular slider window assembly of claim 1, wherein the fixed window panel comprises a single fixed window panel having the opening therethrough.

7. The vehicular slider window assembly of claim 1, wherein the switch device and associated circuitry are part of a unit, and wherein the unit is disposed in the first portion of the housing that is integrally formed with the end stop at the end of the channel portion of the lower rail.

8. The vehicular slider window assembly of claim 1, wherein the switch assembly comprises an elastomeric cover that is disposed at least partially over the housing and over the contact element, and wherein, when the movable window panel is moved to the closed position, the cover flexes to allow for movement of the contact element to actuate the switch device.

9. The vehicular slider window assembly of claim 1, wherein the first portion is integrally formed with the end stop, and wherein the housing comprises a second portion that is snap-attached to the first portion to encase the switch device in the housing.

10. The vehicular slider window assembly of claim 9, wherein the second portion comprises locating elements that locate the switch device at the second portion prior to snap-attaching the second portion to the first portion.

11. The vehicular slider window assembly of claim 1, wherein the first output signal causes activation of an indicator in a cabin of the vehicle to alert the driver of the vehicle that the movable window panel is not in the closed position, and wherein the indicator in the cabin of the vehicle is viewable by the driver of the vehicle.

12. A vehicular slider window assembly, the vehicular slider window assembly comprising:

a frame portion having an upper rail and a lower rail;

a fixed window panel, the fixed window panel having an opening, wherein the upper and lower rails are fixedly attached to an interior surface of the fixed window panel;

a movable window panel that is movable along and between the upper rail and the lower rail, wherein the movable window panel is movable between a closed position, where the movable window panel closes the opening, and an opened position, where the movable window panel is located at least partially along the fixed window panel away from the opening;

a carrier disposed at a lower perimeter edge region of the movable window panel, wherein the carrier is received in a channel portion of the lower rail and moves along the channel portion of the lower rail with the movable window panel as the movable window panel is moved between the opened position and the closed position;

a sensing system operable to determine when the movable window panel is in the closed position and when the movable window panel is not in the closed position, wherein the sensing system comprises a switch assembly that is actuated when the movable window panel is in the closed position;

wherein the switch assembly comprises a switch device disposed within a housing, and wherein at least a first portion of the housing is part of an end stop;

wherein the end stop is disposed at an end of the channel portion of the lower rail, and wherein the end stop is configured to limit movement of the carrier along the channel portion when the movable window panel is moved to the closed position;

wherein the movable window panel is movable between the opened and closed positions by a cable drive system, and wherein cables of the cable drive system are guided by cable guides at opposite ends of the channel portion of the lower rail, and wherein the end stop of the switch assembly comprises one of the cable guides;

wherein the switch device comprises a contact element that extends along the channel portion of the lower rail, and wherein, when the movable window panel is moved to the closed position, the contact element moves to actuate the switch device;

wherein, when the movable window panel is not in the closed position, the contact element does not actuate the switch device;

wherein the end stop is configured to contact the carrier when the movable window panel is moved to the closed position, and wherein, when the movable window panel is moved to the closed position and the first portion contacts the carrier, the contact element is moved by the carrier to actuate the switch device; and wherein, responsive to the switch device not being actuated and the sensing system determining that the movable window panel is not in the closed position, the sensing system generates a first output signal to alert a driver of a vehicle equipped with the vehicular slider window assembly that the movable window panel is not in the closed position.

13. The vehicular slider window assembly of claim 12, wherein the fixed window panel comprises first and second fixed window panels having the opening therebetween.

14. The vehicular slider window assembly of claim 12, wherein the fixed window panel comprises a single fixed window panel having the opening therethrough.

15. The vehicular slider window assembly of claim 12, wherein the switch device and associated circuitry are part of a unit, and wherein the unit is disposed in the first portion of the housing that is integrally formed with the end stop at the end of the channel portion of the lower rail.

16. The vehicular slider window assembly of claim 12, wherein the switch assembly comprises an elastomeric cover that is disposed at least partially over the housing and over the contact element, and wherein, when the movable window panel is moved to the closed position, the cover flexes to allow for movement of the contact element to actuate the switch device.

17. The vehicular slider window assembly of claim 12, wherein the first portion is integrally formed with the end stop, and wherein the housing comprises a second portion that is snap-attached to the first portion to encase the switch device in the housing.

18. A vehicular slider window assembly, the vehicular slider window assembly comprising:

a frame portion having an upper rail and a lower rail;

a fixed window panel, the fixed window panel having an opening, wherein the upper and lower rails are fixedly attached to an interior surface of the fixed window panel;

a movable window panel that is movable along and between the upper rail and the lower rail, wherein the movable window panel is movable between a closed position, where the movable window panel closes the opening, and an opened position, where the movable window panel is located at least partially along the fixed window panel away from the opening;

a carrier disposed at a lower perimeter edge region of the movable window panel, wherein the carrier is received in a channel portion of the lower rail and moves along the channel portion of the lower rail with the movable window panel as the movable window panel is moved between the opened position and the closed position;

a sensing system operable to determine when the movable window panel is in the closed position and when the movable window panel is not in the closed position, wherein the sensing system comprises a switch assembly that is actuated when the movable window panel is in the closed position;

wherein the switch assembly comprises a switch device disposed within a housing, and wherein at least a first portion of the housing is part of an end stop;

wherein the end stop is disposed at an end of the channel portion of the lower rail, and wherein the end stop is configured to limit movement of the carrier along the channel portion when the movable window panel is moved to the closed position;

wherein the switch device comprises a contact element that extends along the channel portion of the lower rail, and wherein, when the movable window panel is moved to the closed position, the contact element moves to actuate the switch device;

wherein, when the movable window panel is not in the closed position, the contact element does not actuate the switch device;

wherein the switch device and associated circuitry are part of a unit, and wherein the unit is disposed in the first portion of the housing that is integrally formed with the end stop at the end of the channel portion of the lower rail;

wherein the first portion is integrally formed with the end stop, and wherein the housing comprises a second portion that is snap-attached to the first portion to encase the switch device in the housing; and wherein, responsive to the switch device not being actuated and the sensing system determining that the movable window panel is not in the closed position, the sensing system generates a first output signal to alert a driver of a vehicle equipped with the vehicular slider window assembly that the movable window panel is not in the closed position.

19. The vehicular slider window assembly of claim 18, wherein the movable window panel is movable between the opened and closed positions by a cable drive system, and wherein cables of the cable drive system are guided by cable guides at opposite ends of the channel portion of the lower rail, and wherein the end stop of the switch assembly comprises one of the cable guides.

20. The vehicular slider window assembly of claim 18, wherein the end stop is configured to contact the carrier when the movable window panel is moved to the closed position, and wherein, when the movable window panel is moved to the closed position and the first portion contacts the carrier, the contact element is moved by the carrier to actuate the switch device.

21. The vehicular slider window assembly of claim 18, wherein the fixed window panel comprises first and second fixed window panels having the opening therebetween.

22. The vehicular slider window assembly of claim 18, wherein the fixed window panel comprises a single fixed window panel having the opening therethrough.

23. The vehicular slider window assembly of claim 18, wherein the switch assembly comprises an elastomeric cover that is disposed at least partially over the housing and over the contact element, and wherein, when the movable window panel is moved to the closed position, the cover flexes to allow for movement of the contact element to actuate the switch device.

24. The vehicular slider window assembly of claim 18, wherein the second portion comprises locating elements that locate the switch device at the second portion prior to snap-attaching the second portion to the first portion.

* * * * *